Aug. 5, 1958     J. J. RICHARD     2,846,071
WASHING JIG
Filed April 26, 1956     22 Sheets-Sheet 2

Aug. 5, 1958  J. J. RICHARD  2,846,071
WASHING JIG

Filed April 26, 1956  22 Sheets-Sheet 9

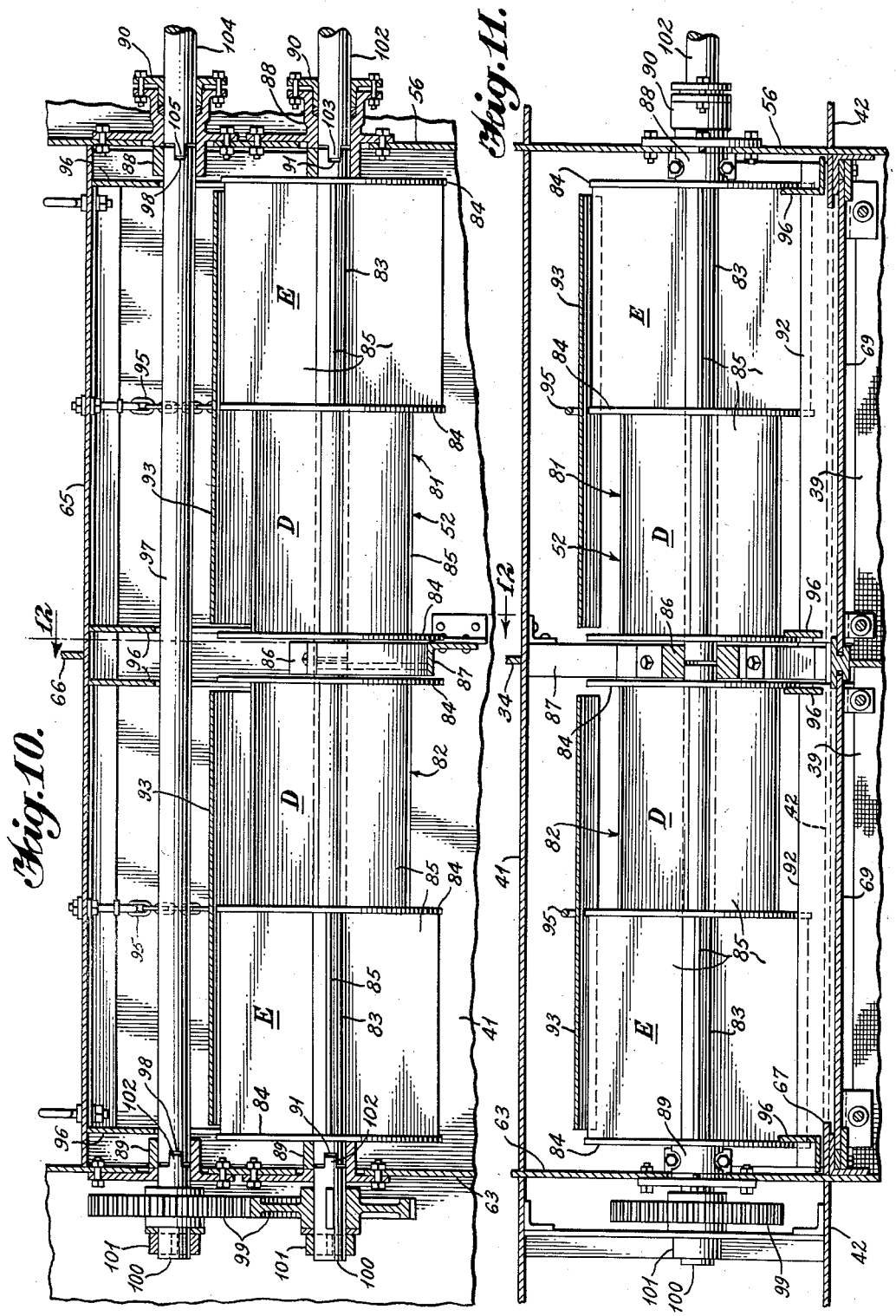

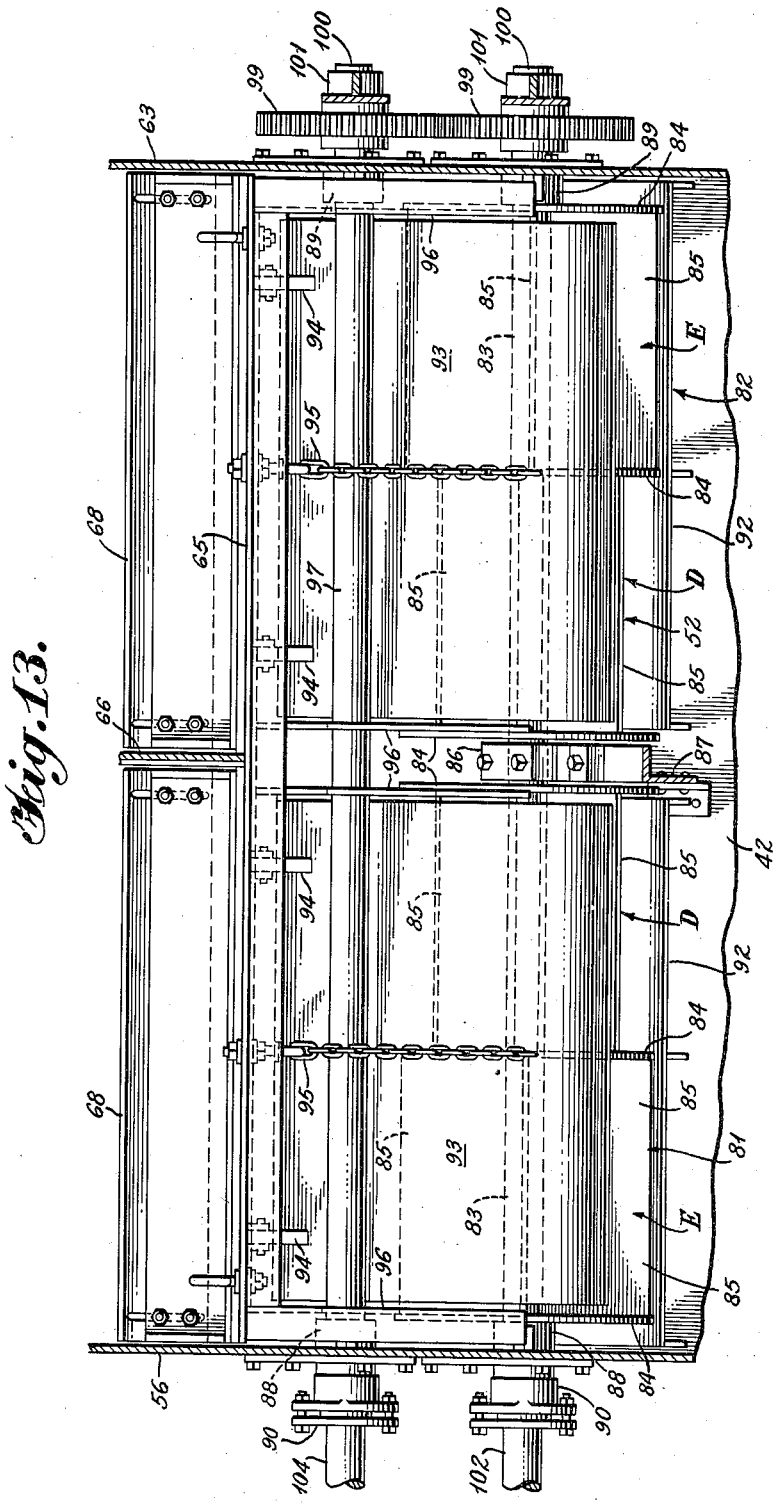

Aug. 5, 1958 J. J. RICHARD 2,846,071
WASHING JIG

Filed April 26, 1956 22 Sheets-Sheet 12

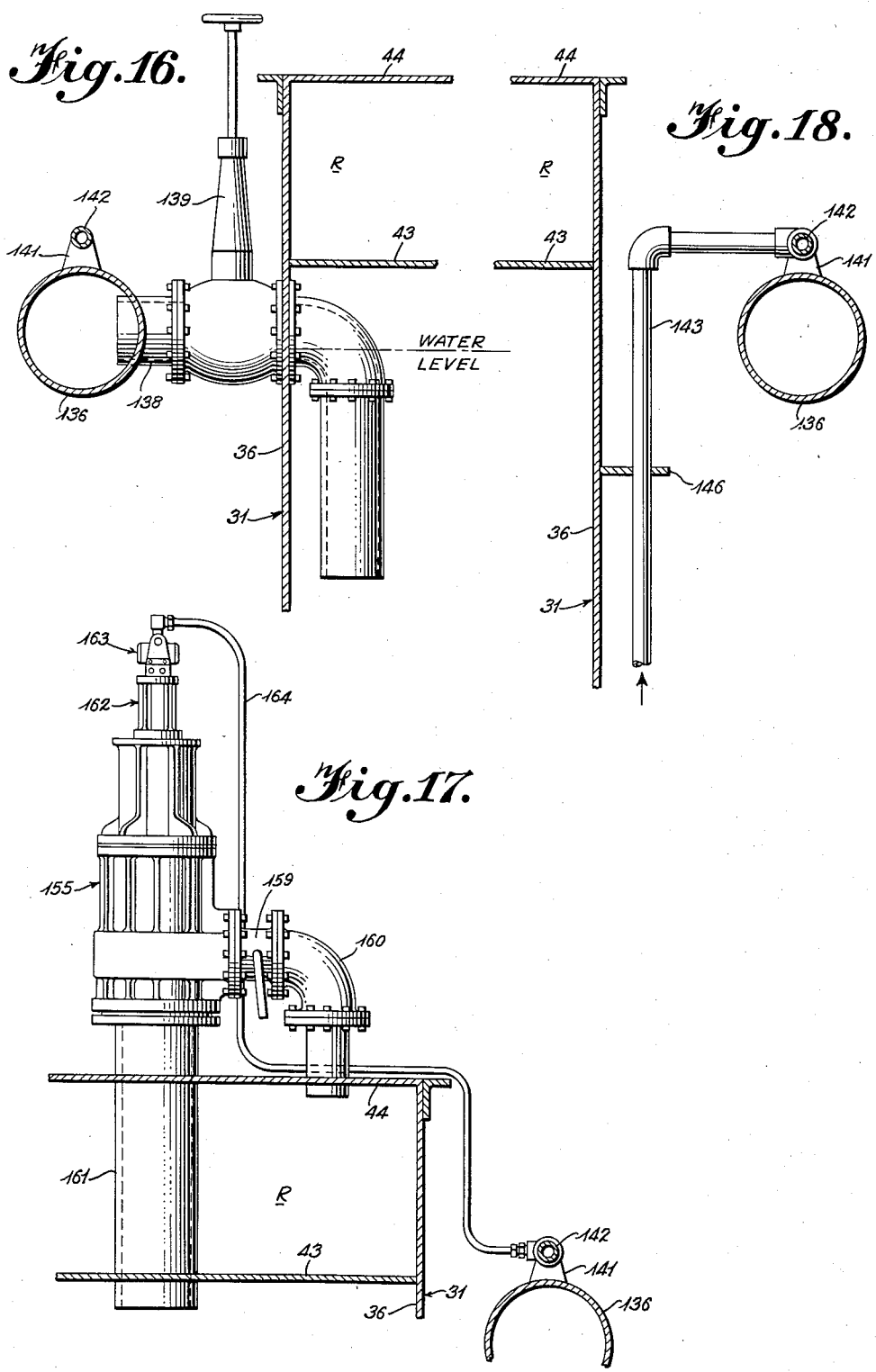

Aug. 5, 1958 J. J. RICHARD 2,846,071
WASHING JIG
Filed April 26, 1956 22 Sheets-Sheet 15
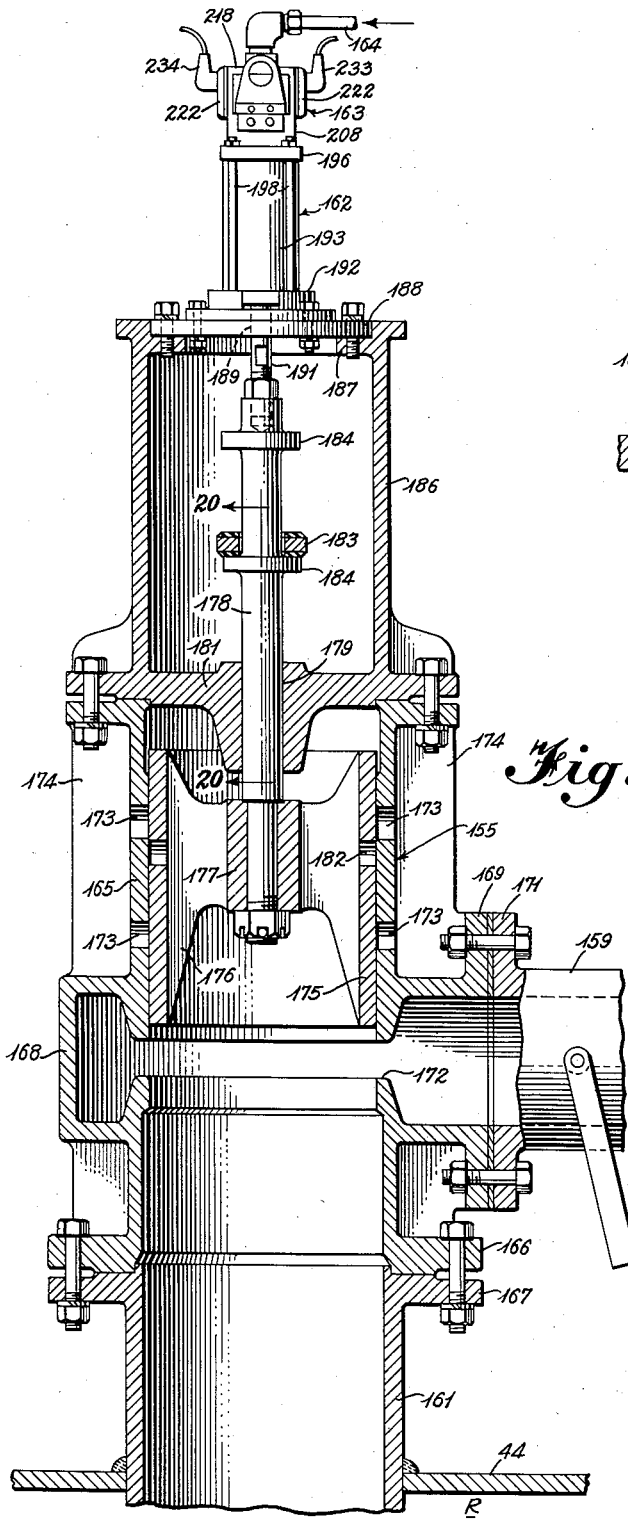
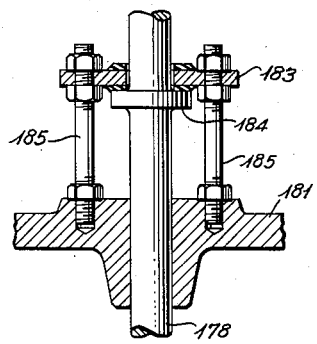
Fig. 20.
Fig. 19.

Aug. 5, 1958  J. J. RICHARD  2,846,071
WASHING JIG
Filed April 26, 1956  22 Sheets-Sheet 16

Aug. 5, 1958 — J. J. RICHARD — 2,846,071
WASHING JIG
Filed April 26, 1956 — 22 Sheets-Sheet 17
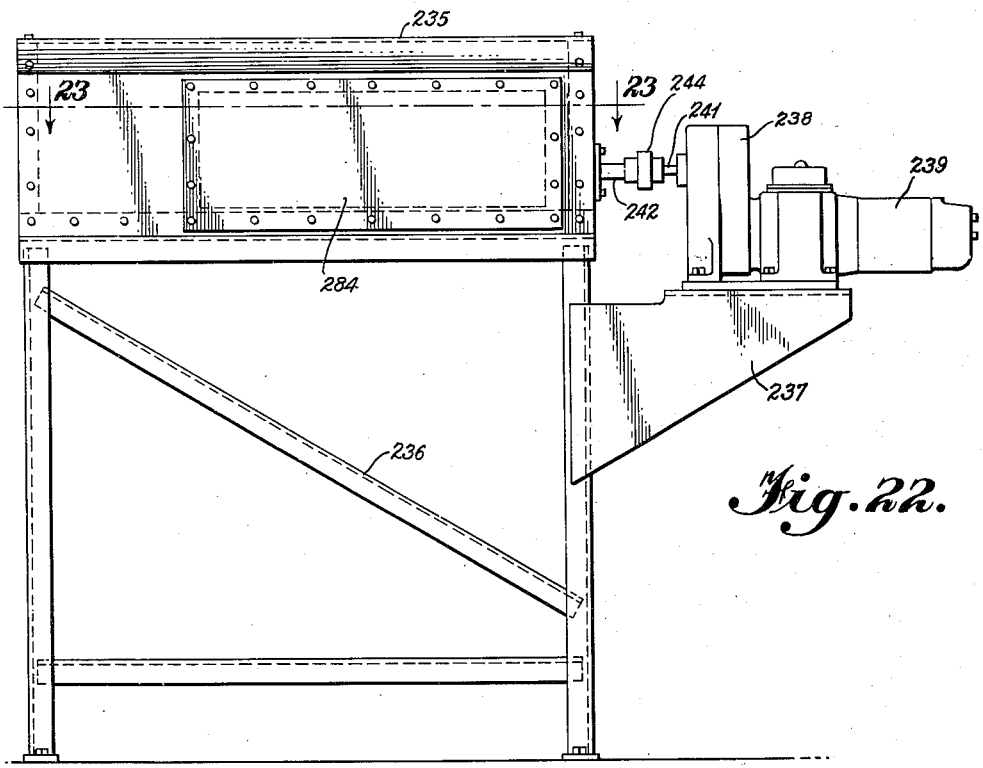
Fig. 22.
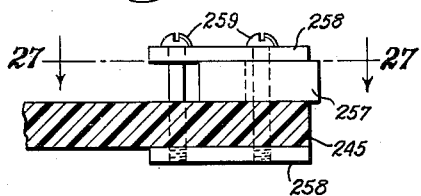
Fig. 26.
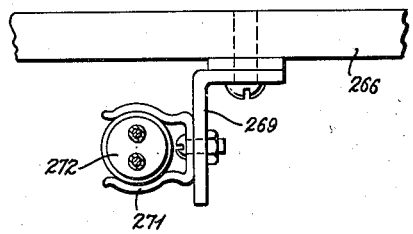
Fig. 28.
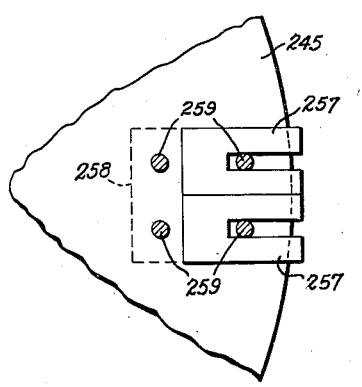
Fig. 27.
Fig. 29.

Aug. 5, 1958     J. J. RICHARD     2,846,071
WASHING JIG

Filed April 26, 1956     22 Sheets-Sheet 18

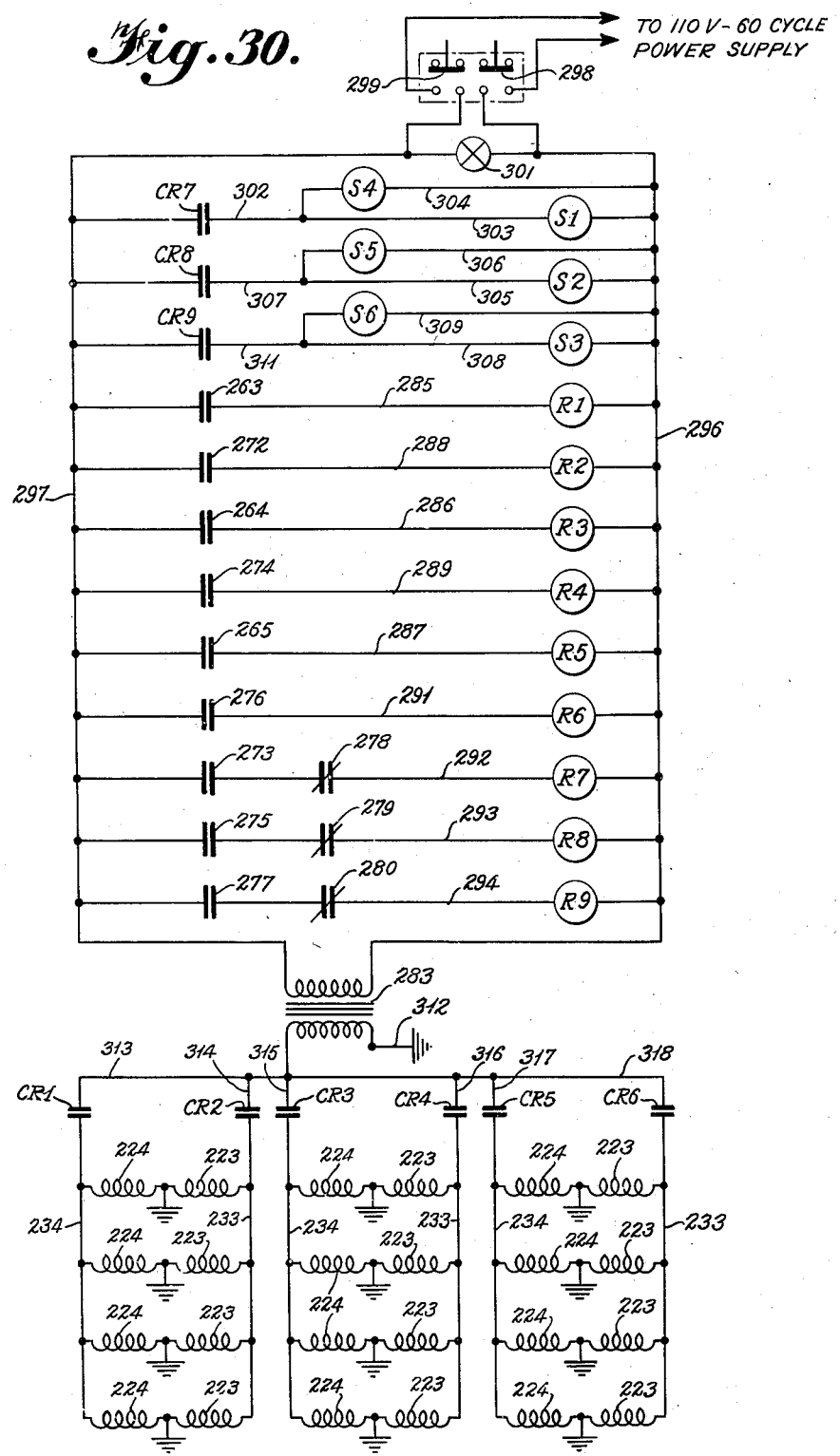

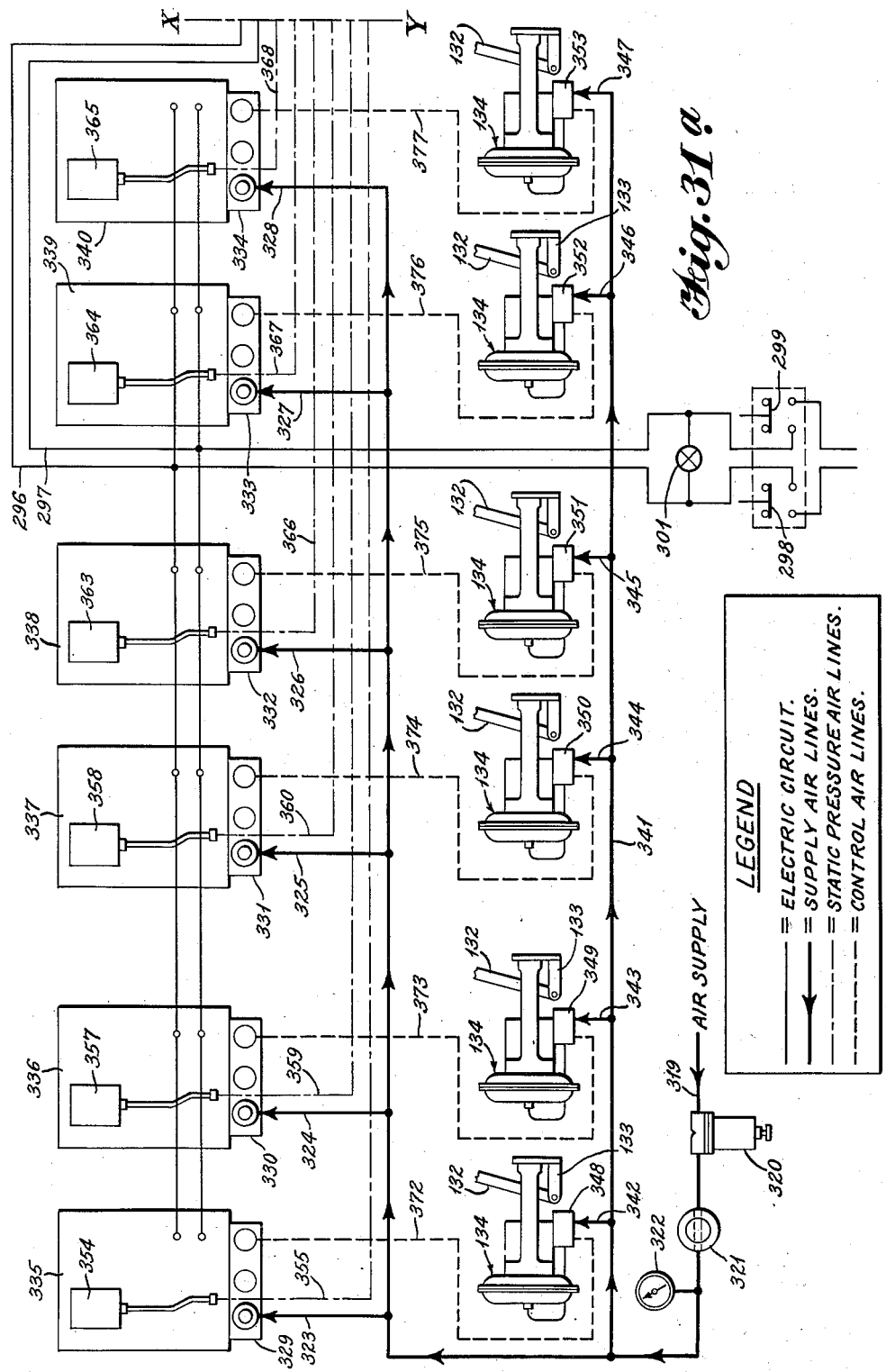

Aug. 5, 1958 J. J. RICHARD 2,846,071
WASHING JIG
Filed April 26, 1956 22 Sheets-Sheet 22
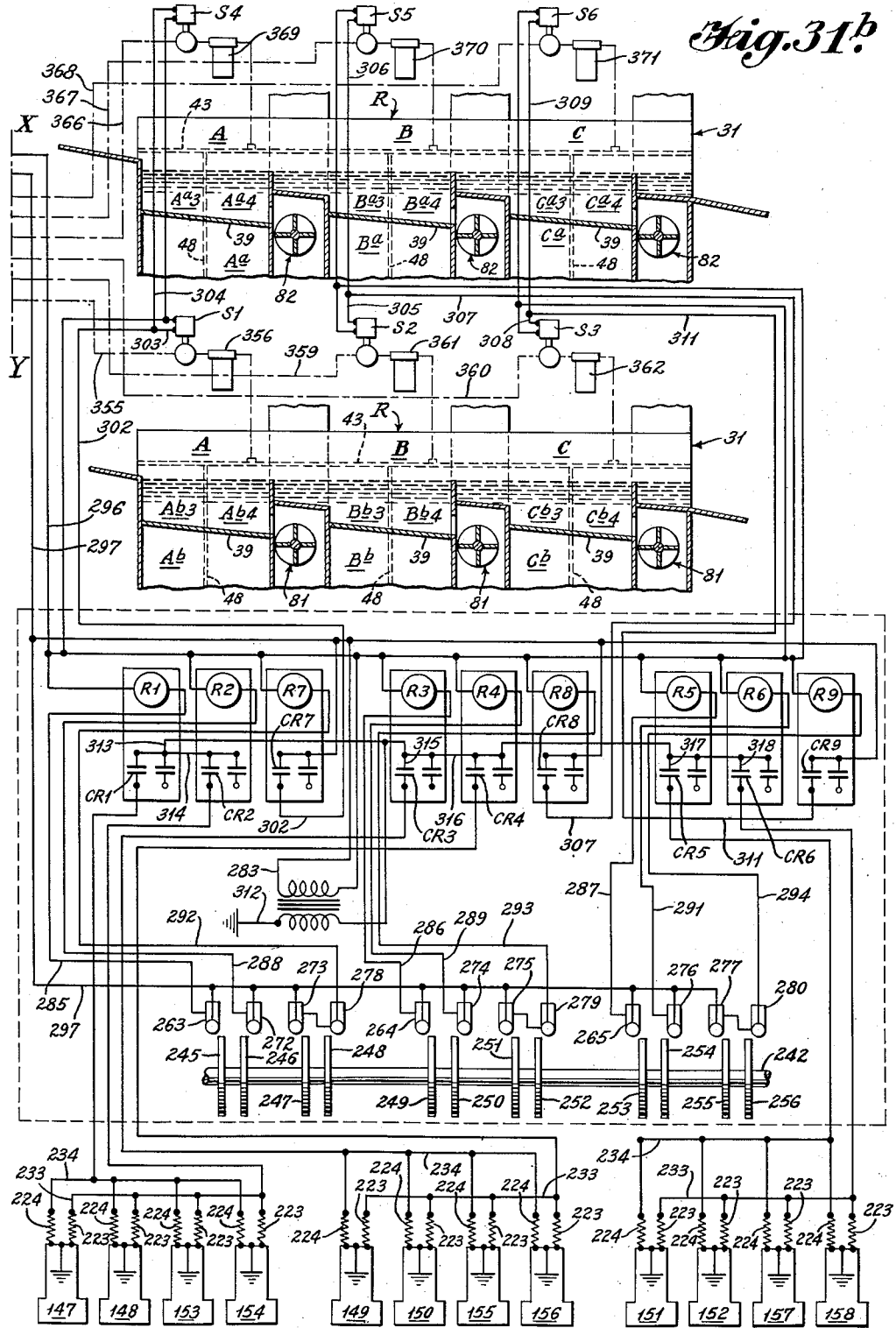
Fig.31ᵇ

2,846,071

WASHING JIG

Joseph J. Richard, Chicago, Ill., assignor to Link-Belt Company, a corporation of Illinois Application April 26, 1956, Serial No. 580,904

18 Claims. (Cl. 209—455)

This invention relates to new and useful improvements in apparatus for continuously cleaning and separating minerals of different settling rates and deals more particularly with apparatus of the above type that is referred to in the industry as washing jigs.

It is conventional practice to clean minerals such as coal, ore, and the like, and to separate the refuse therefrom by means of washing jigs which stratify particles of lower and higher settling rates by subjecting a screen supported bed of the minerals to alternate pulsion and suction strokes of a body of water. During each pulsion stroke, water is forced upwardly through the screen and both lifts and opens up the bed of minerals so that the particles of the bed having the higher settling rate are lifted to a lesser extent than the particles of lower settling rate. During each suction stroke, the water passes downwardly through the screen and the mineral particles of the bed settle in accordance with their different settling rates. Repetition of these alternate pulsion and suction strokes at a speed of from 25 to 55 cycles per minute effects a progressive stratification of the mineral particles in the bed as the material advances through the jig so that the particles having the higher settling rate will collect in a layer at the bottom portion and those having a lower settling rate will collect as a layer in the upper portion of the bed. At the discharge end of the bed, the mineral particles forming these two layers are separately removed to effect the desired separation between the refuse and the valuable particles.

Under certain conditions, it has been found that a conventional washing jig will operate more efficiently if its interior is divided lengthwise, or in the direction of movement of the material, into two or more compartments which function successively to effect separation of the particles according to their different settling rates. With such an arrangement, each compartment is provided with means for removing the higher settling rate particles, forming the layer at the bottom portion of the bed, from the jig and means for passing the lower settling rate particles, forming the layer at the upper portion of the bed, into the next successive compartment or out of the exit end of the jig, depending on which compartment is being considered. In this manner, the bed of material being treated is progressively freed as it advances through the successive compartments, of the higher settling rate particles, which in the case of coal will be the refuse, so that the lower settling rate particles that are passed out of the final compartment, or from the exit end of the jig, will be a clean valuable product.

It also has been found that the operation of a conventional washing jig may be further improved by dividing into two or more cells the portions of each of the above mentioned compartments that are located below the bed supporting screens. These cells are separated from each other by laterally arranged partitions which are positioned beneath the bed supporting screen and extend into a communicating chamber adjacent one side of the jig. Compressed air, therefore, may be independently admitted to and released from the upper portion of the chamber associated with each cell by means of valves that are operated by cams mounted on a common shaft. The relative positions of the cams on their shaft may be varied to adjust the relationship between the cycles of pulsion and suction strokes in the various cells. Different portions of the bed in a compartment of the washing jig, therefore, may be subjected to the pulsion or suction strokes of the wash water in timed relationship to provide efficient operation throughout the length of the bed.

Conventional washing jigs of the above described type will function in an efficient manner and may be adapted to handle a wide variety of minerals. Increases or reductions in the number of compartments and cells, however, will have relatively little effect on the rate of flow of mineral particles through the jig and the capacity of the jig is limited by the width of the bed supporting screen. As the width of the screen is increased to provide a washing jig having a greater capacity, however, several difficulties are encountered.

For example, if the mineral particles are introduced to the jig through a chute that is substantially narrower than the width of the bed, there will be a lack of uniformity in depth across the bed and poor operating conditions will result. On the other hand, if the mineral particles are spread across a wider chute for introduction to the bed over its entire width, there is almost invariably a segregation of the particles as to size and there will be a preponderance of larger particles in one portion of the bed and of smaller particles in another portion of the bed. This condition also results in poor operating conditions of the washing jig.

A further difficulty is encountered in maintaining the desired degree of uniformity in the action of the pulsion and suction strokes of the water across a wider bed of material. In other words, as the width of the bed is increased, more variations will occur in the direction and velocity of the water flowing through the screen for a given cell. As a result, the stratification of the particles having different settling rates is irregular or incomplete.

Another problem encountered in connection with the use of conventional washing jigs having wider bed supporting screens stems from the fact that increases in the width of the bed require a corresponding increase in the quantity of water displaced during each pulsion and suction stroke. Obviously, the frequent shifting of the weight of a large quantity of water will impose a high stress on the structure supporting the washing jig and expensive reinforcing structure may be required to withstand particularly high stresses.

One of the principal difficulties encountered with prior washing jigs employing cam operated valves has been the inability to easily and quickly adjust the proportional part of each cycle during which air is admitted to and released from the jig to inversely vary the duration of the pulsion and suction strokes. In other words, if the mineral particles in the bed are predominantly of a larger size, it has been established that most efficient operation will result when each cycle is divided into a pulsion stroke of maximum duration and a very short suction stroke. On the other hand, a bed of smaller sized particles can be most efficiently processed with a short pulsion stroke and a long suction stroke, and intermediate sized particles respond best to pulsion and suction strokes which are more nearly equal in duration.

It is the primary object of this invention to provide a washing jig having a very high processing capacity which will efficiently clean and separate the refuse from the valuable product.

A further important object of the invention is to provide a washing jig which will subject different portions across the width of the bed of mineral particles to the independently controlled action of the washing liquid to permit efficient operation of the jig in accordance with the particular characteristics of the particles in the different portions of the bed.

Another important object of the invention is to provide a washing jig which will efficiently process a wide bed of mineral particles by subjecting the particles in the opposite side portions of the bed to separately actuated impulses of the washing liquid.

A still further object of the invention is to provide a washing jig employing a large quantity of water for displacement to effect pulsating movement of the water through the mineral particles being processed, the pulsations of the water in different portions of the jig being so balanced as to substantially eliminate horizontally applied stresses from the structure supporting the jig.

A further object of the invention is to provide a washing jig wherein the rate of flow of the pulsion and suction strokes of the washing liquid in each cycle of operation may be independently and easily adjusted for each cell of the jig to provide the most efficient operation for the particles of minerals being processed in the cell.

Another object of the invention is to provide a washing jig employing a plurality of valves movable between alternate positions for effecting pulsations of the washing liquid in the different cells of the box, the rates of movement of the valves between their alternate positions being independently controlled to permit operation of each cell in the most efficient manner possible.

Other objects and advantages of the invention will be apparent during the course of the following description.

In the accompanying drawings forming a part of this specification and in which like reference characters are employed to designate like parts throughout the same;

Figure 1:
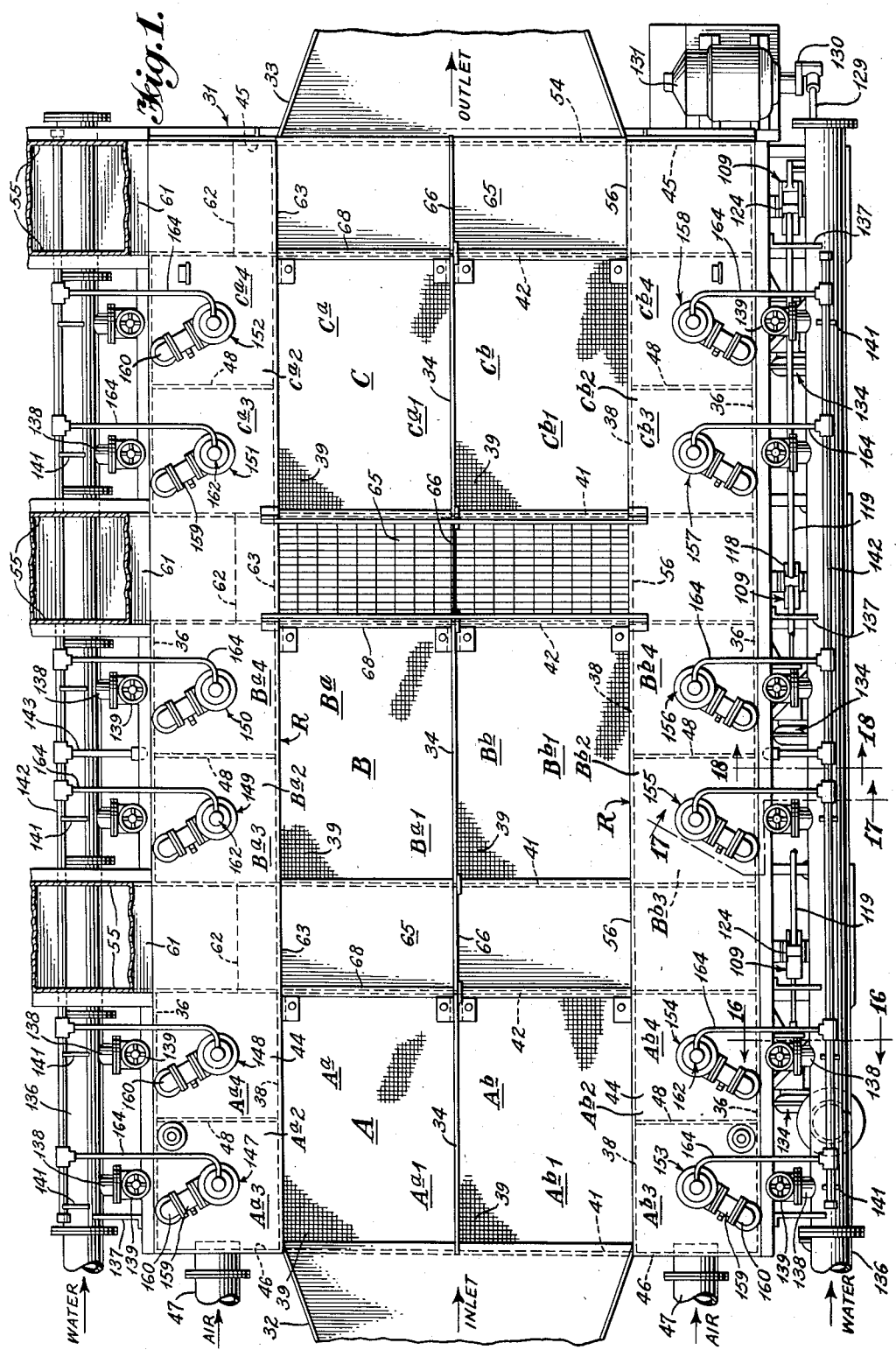
Figure 1 is a top plan view of a washing jig embodying the invention.
Figure 3:
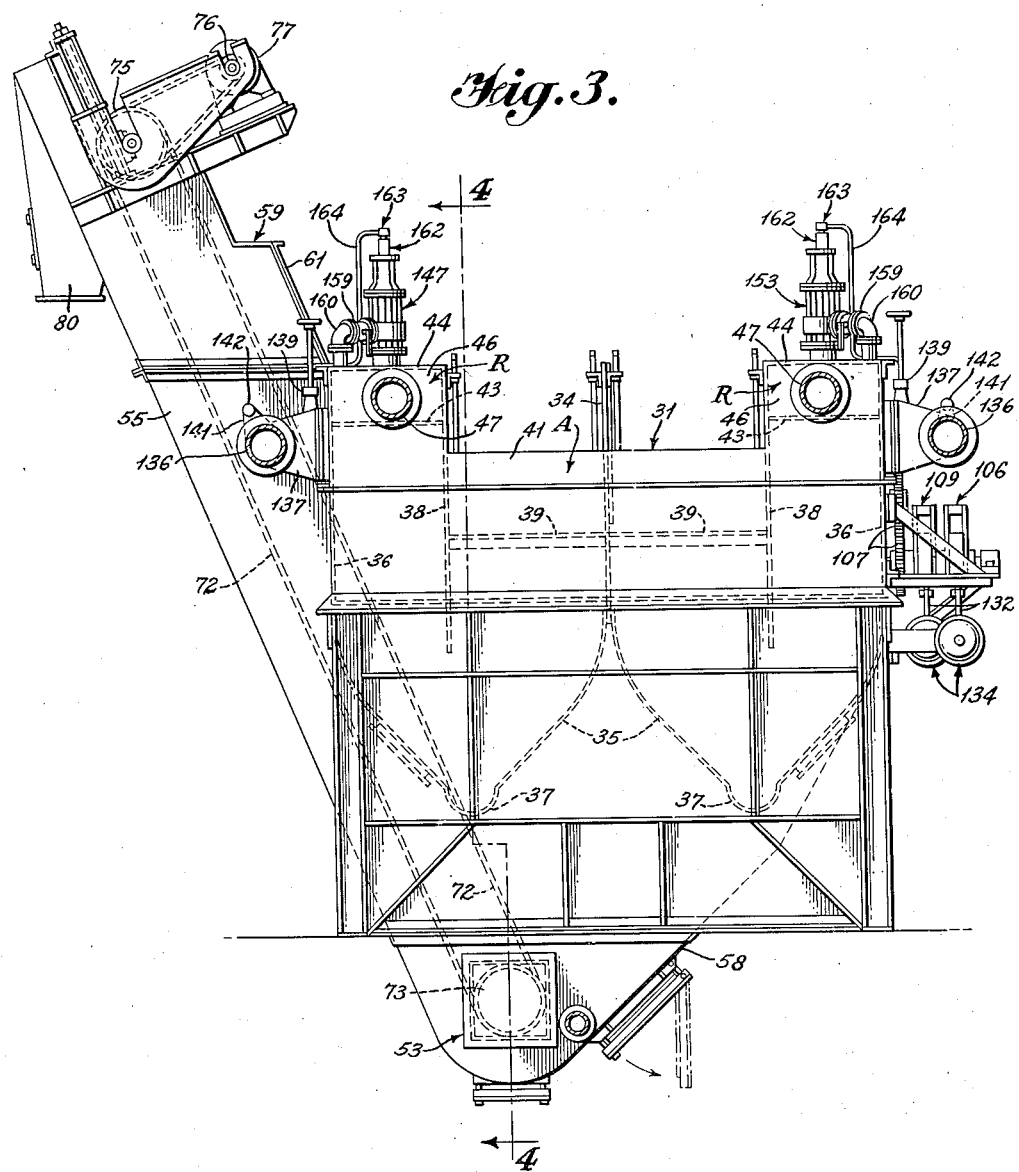
Figure 4:
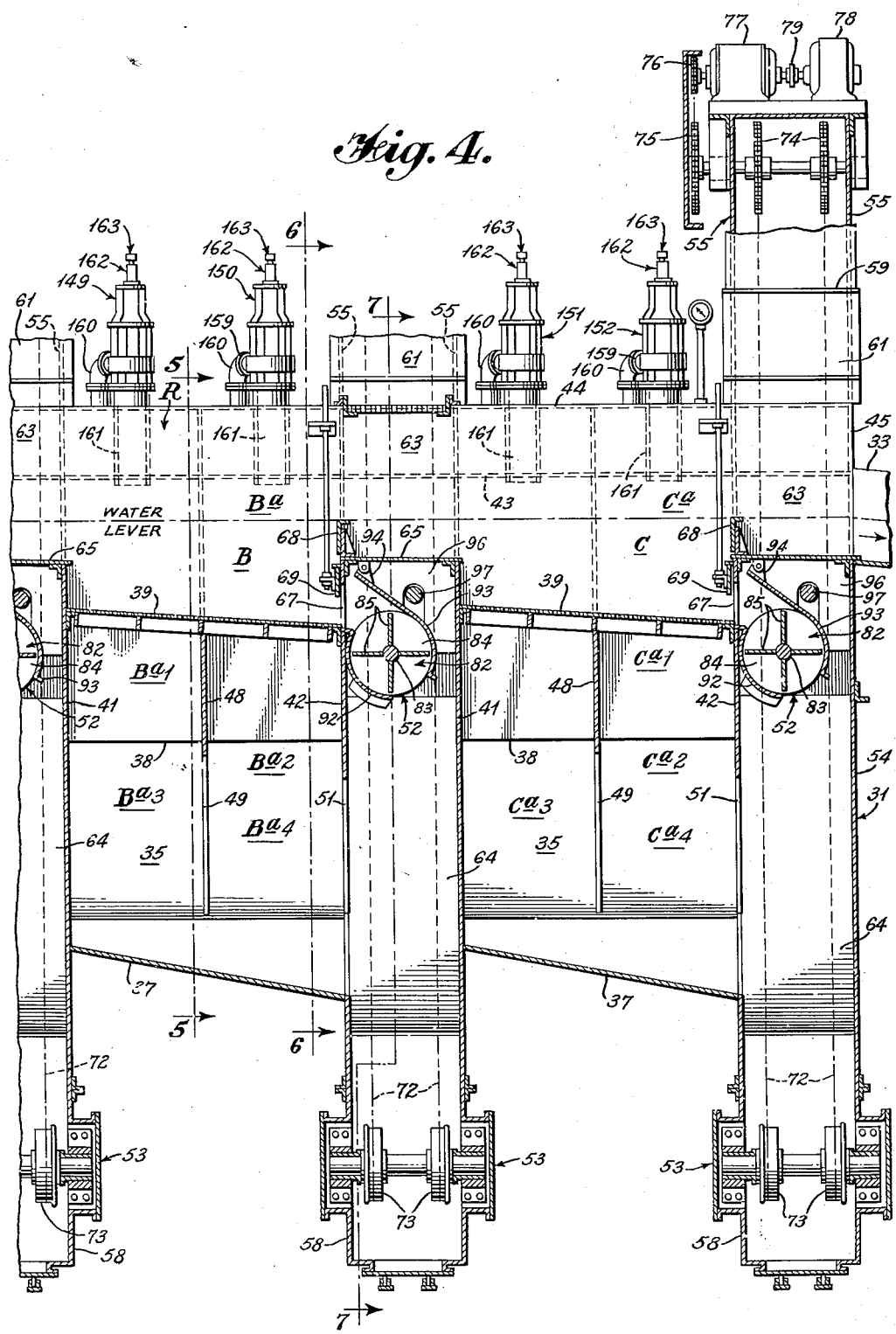
Figure 5:
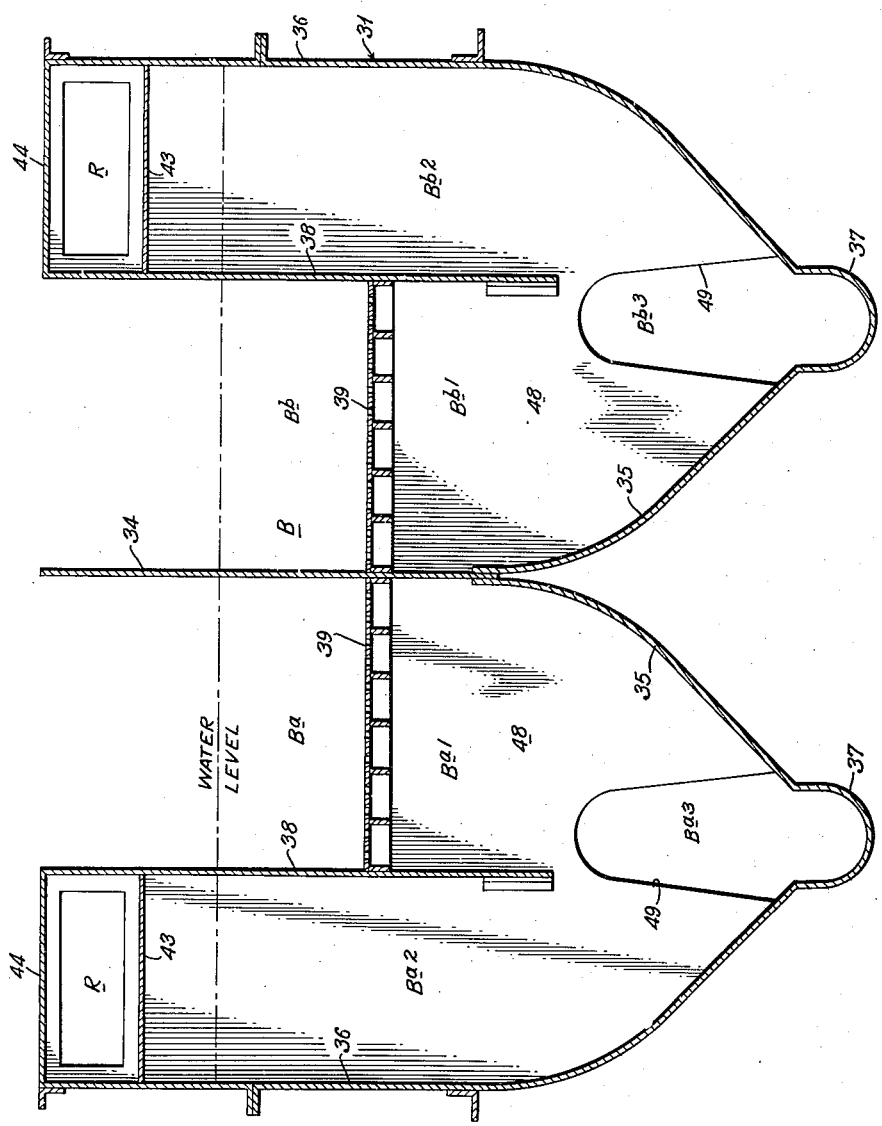
Figure 6:
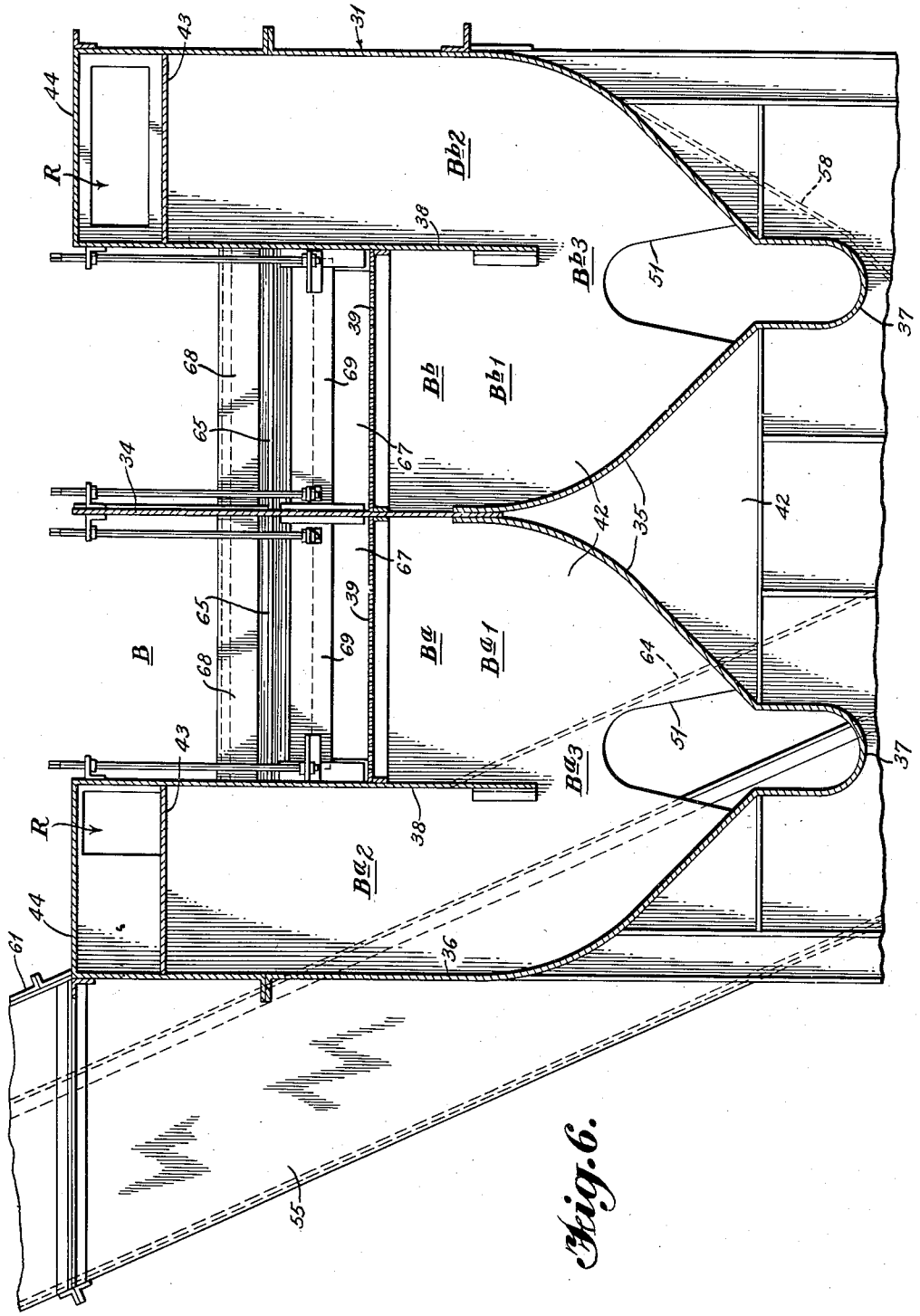
Figure 7:
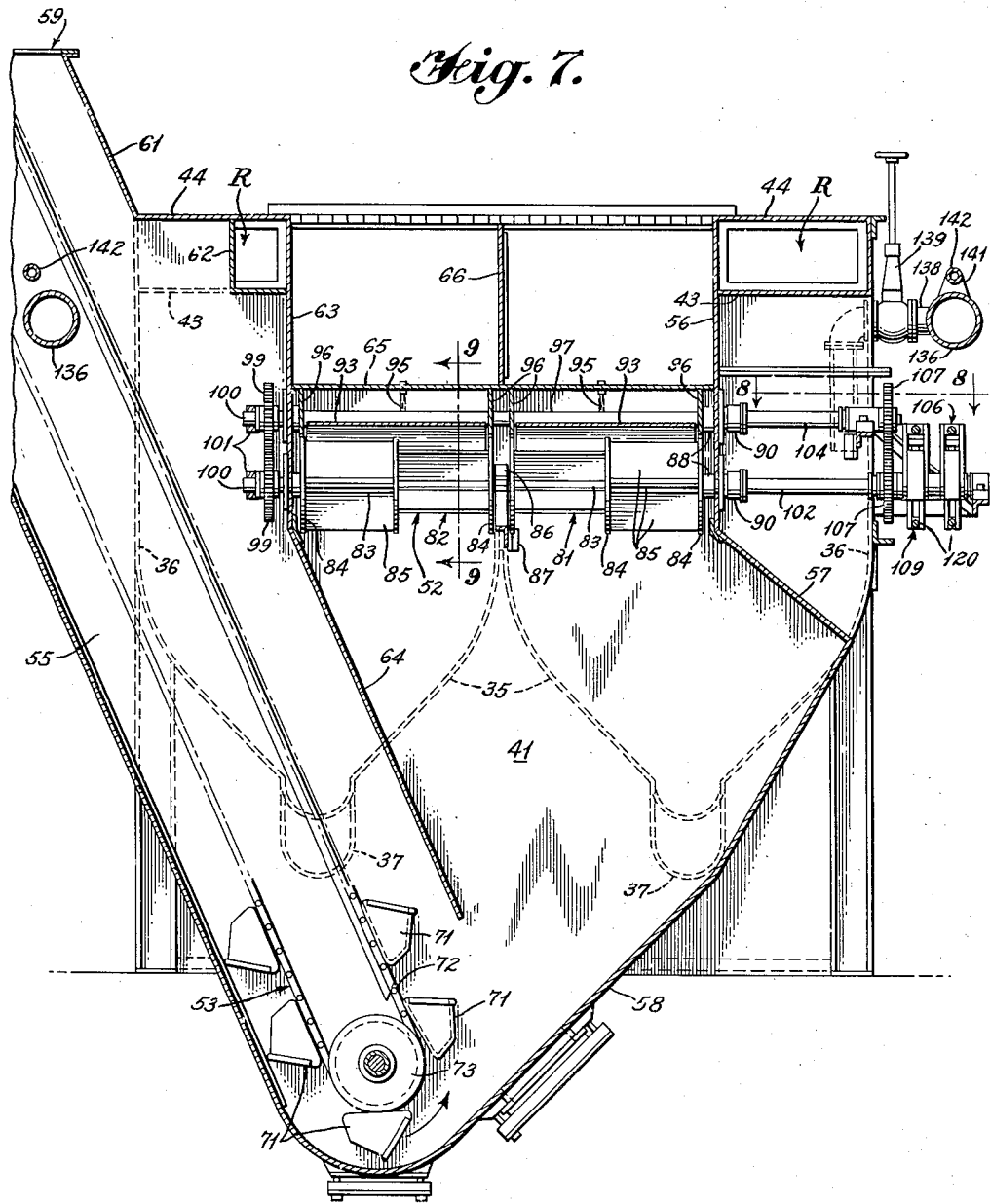
Figure 8:
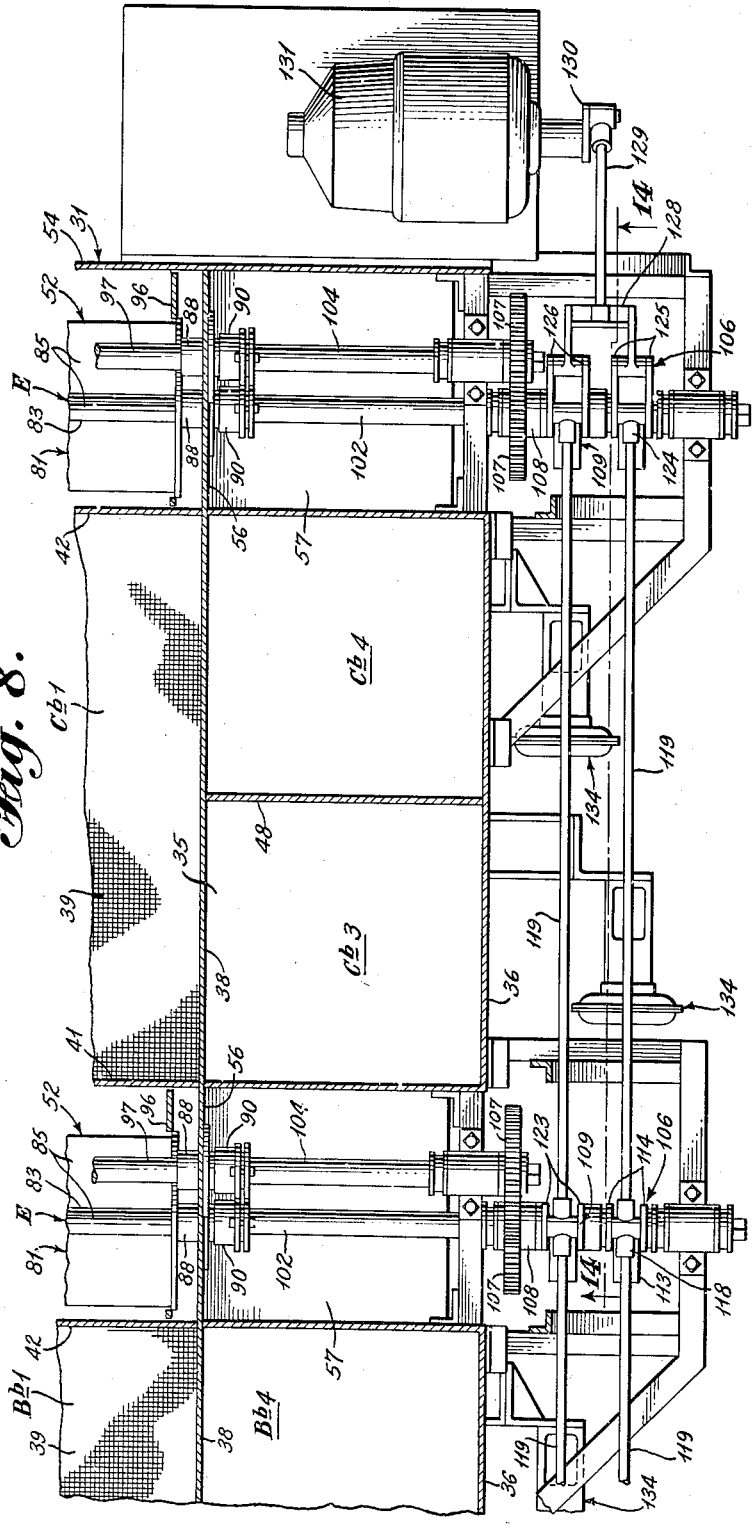
Figure 9:
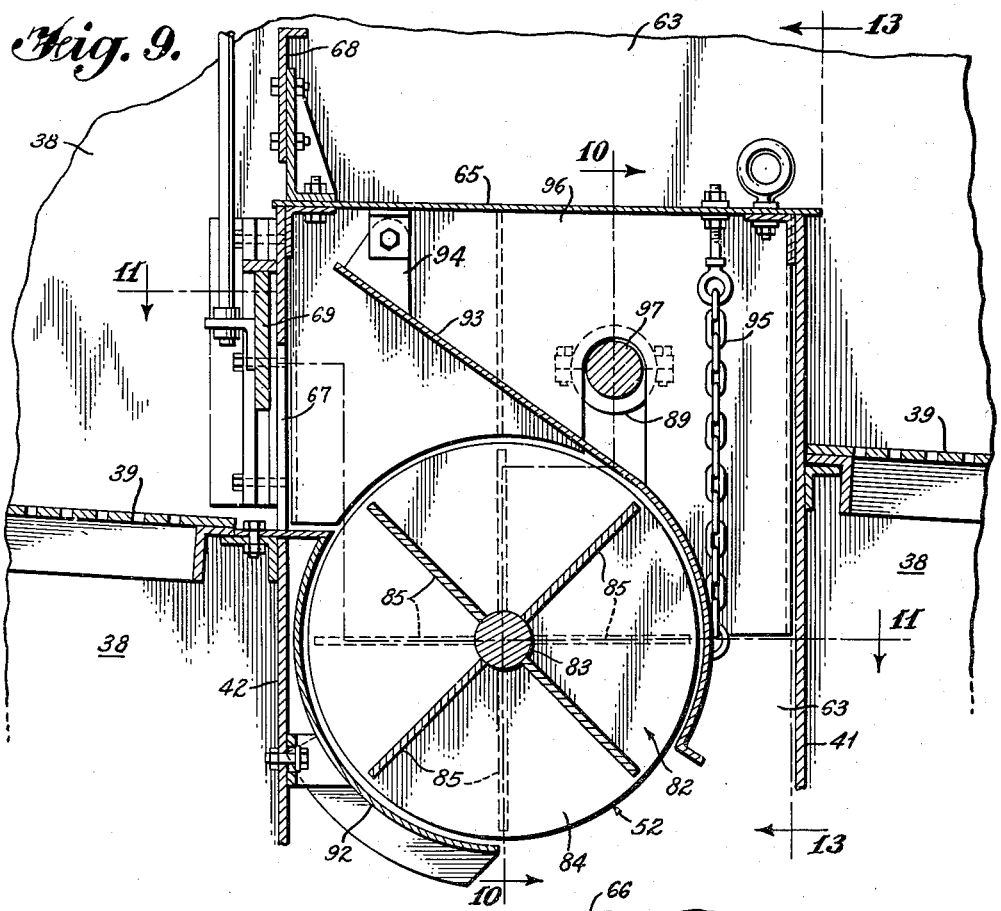
Figure 12:
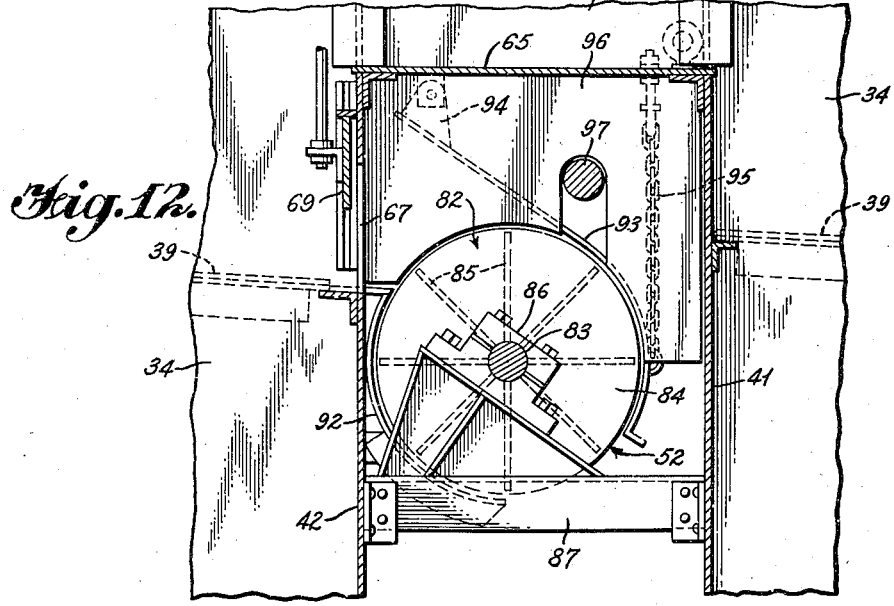
Figure 14:
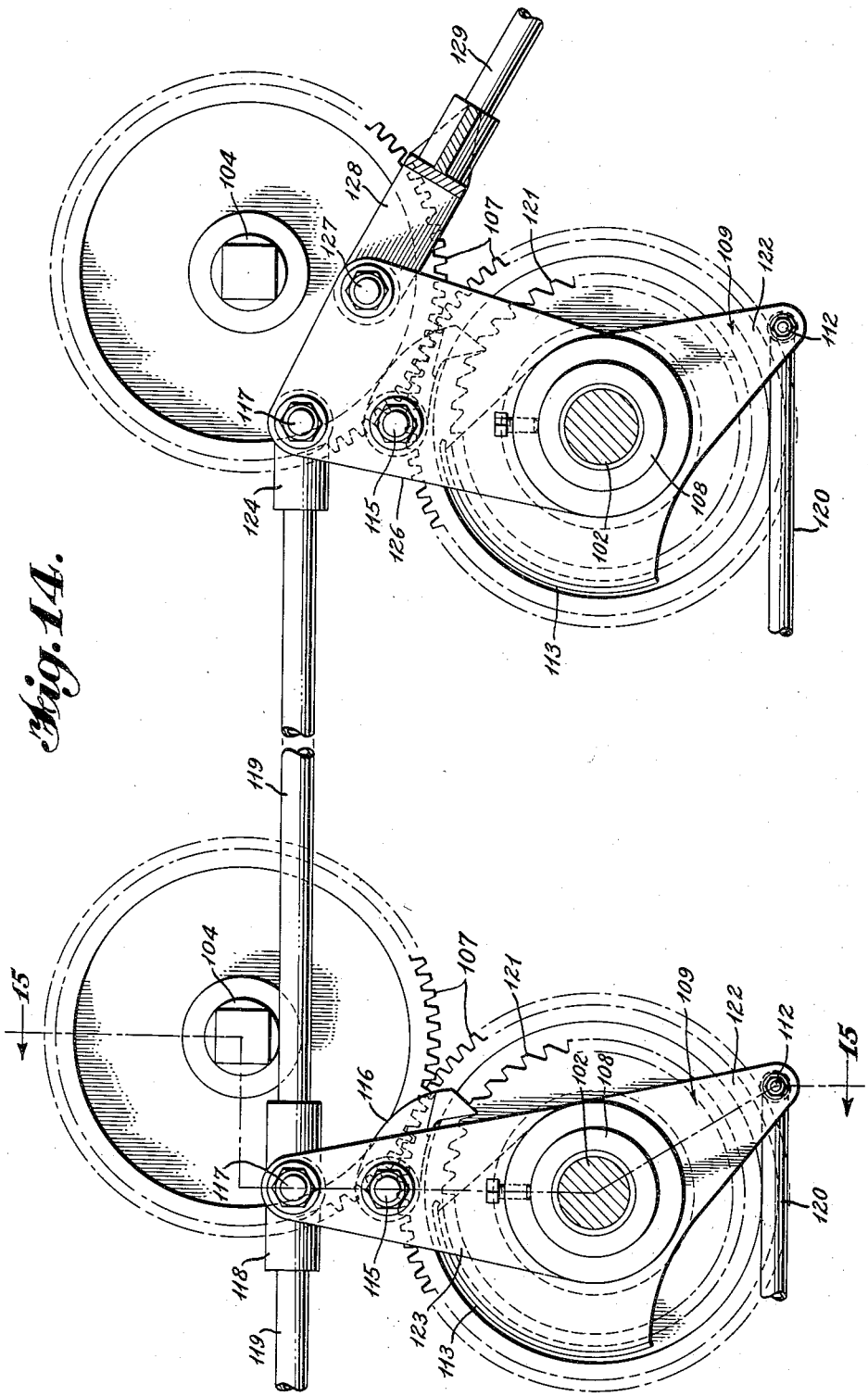
Figure 15:
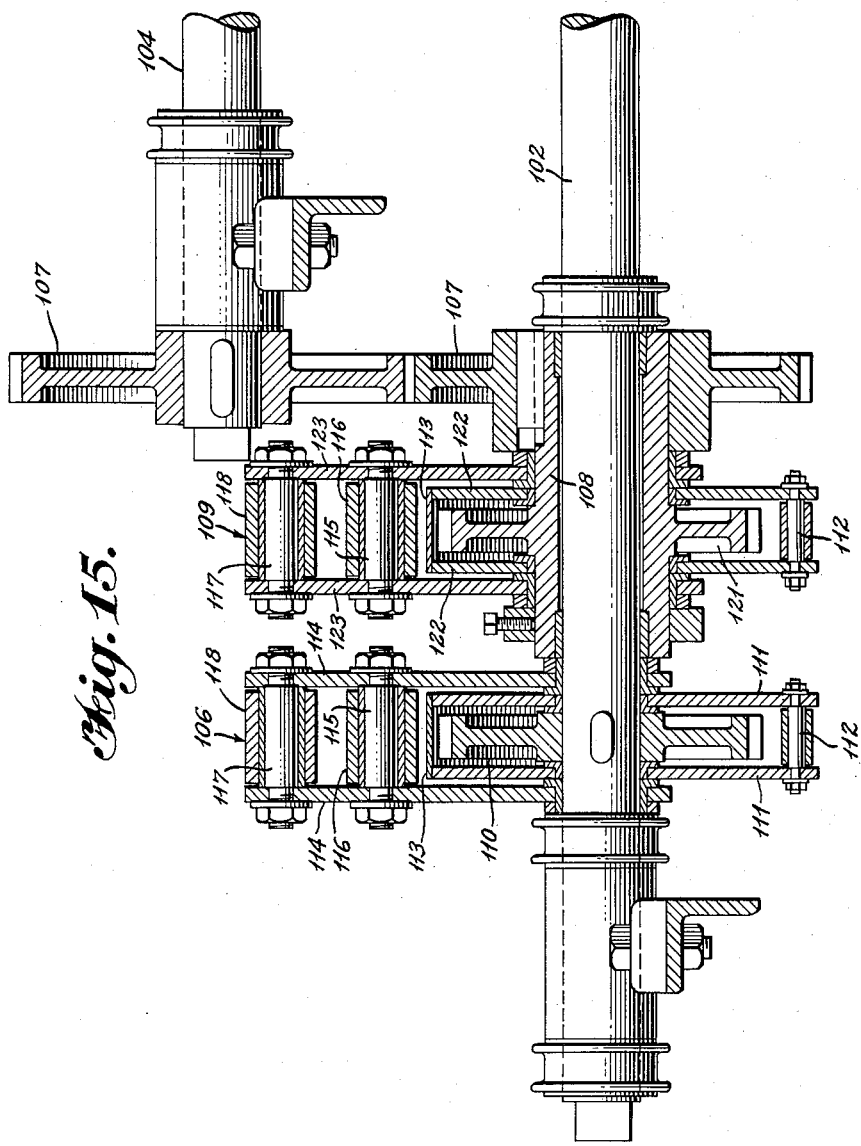
Figure 21:
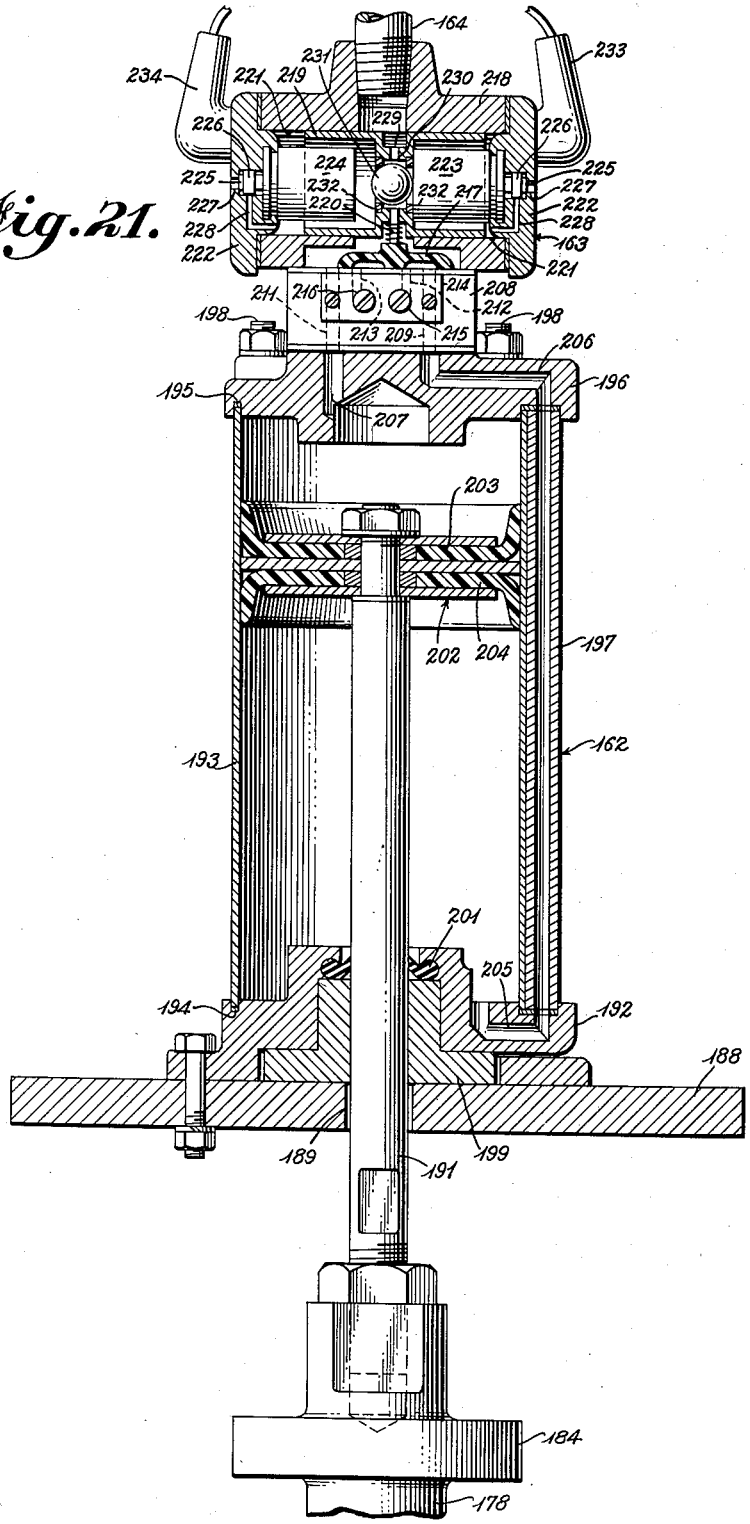
Figure 23:
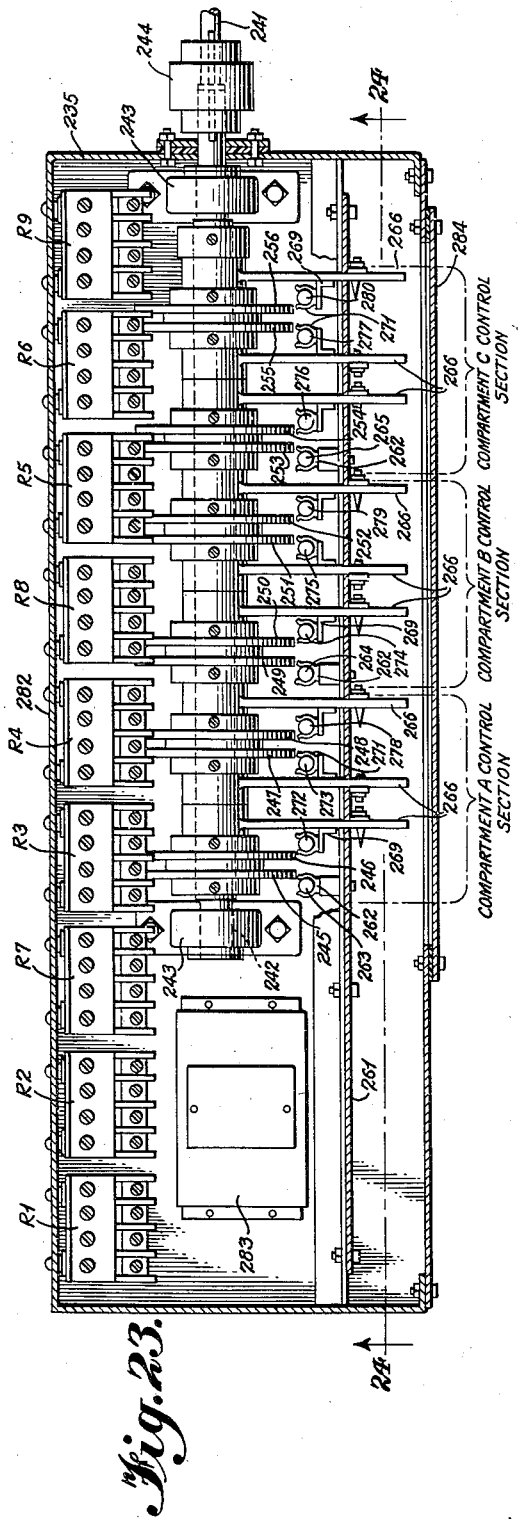
Figure 24:
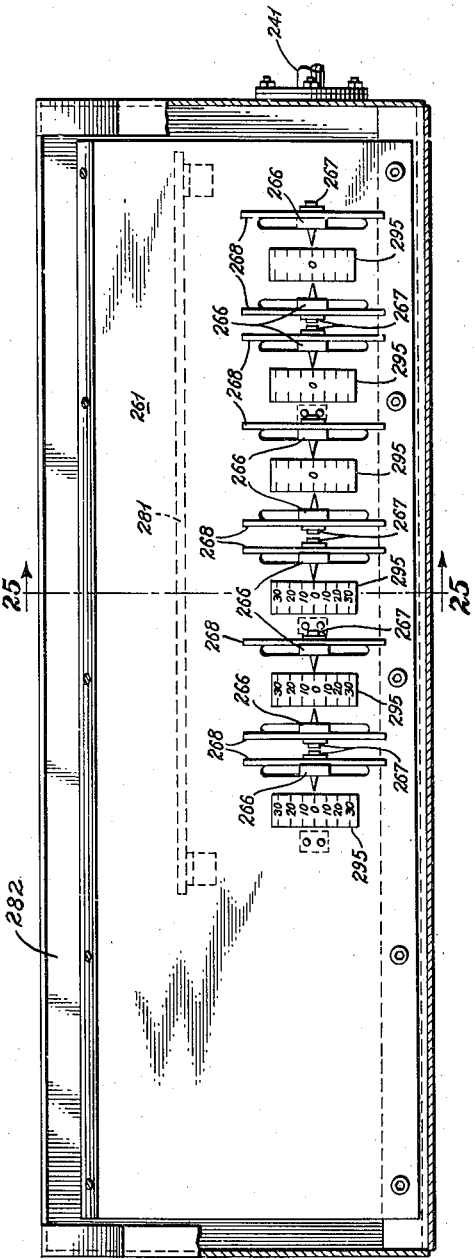
Figure 25:
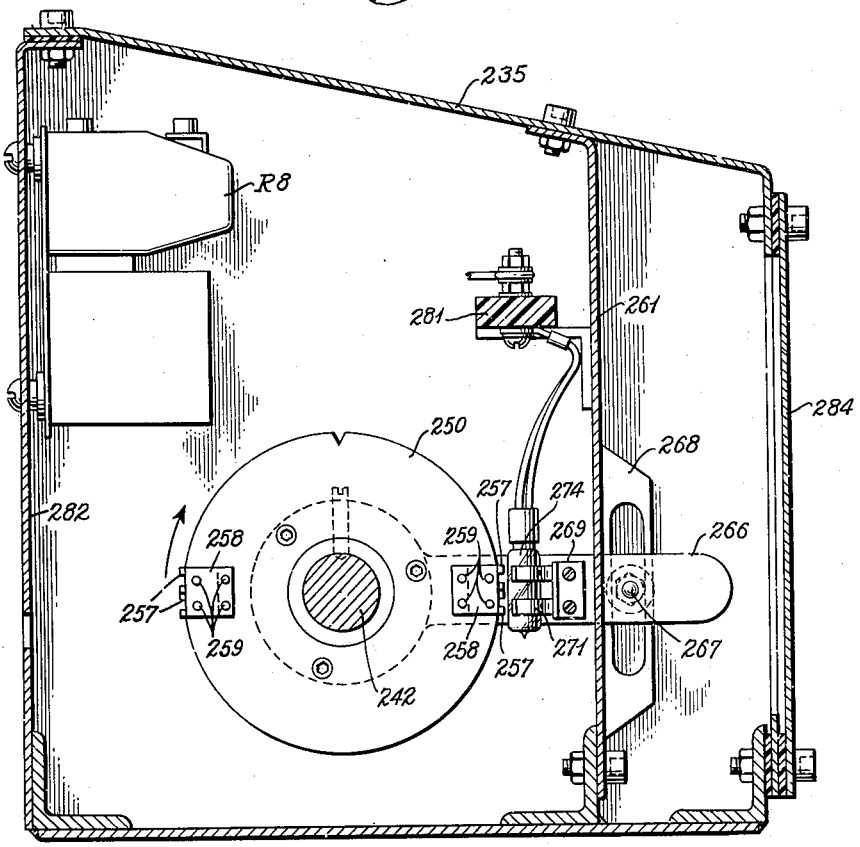

Figure 3 is an elevational view of the feed end of the jig illustrated in Fig. 1, Figure 4 is a vertical sectional view taken on line 4—4 of Fig. 3, Figure 5 is a transverse sectional view taken on line 5—5 of Fig. 4, Figure 6 is a transverse sectional view taken on line 6—6 of Fig. 4, Figure 7 is a transverse sectional view taken on line 7—7 of Fig. 4, Figure 8 is an enlarged sectional view taken on line 8—8 of Fig. 7, Figure 9 is an enlarged sectional view taken on line 9—9 of Fig. 7, Figure 10 is a vertical sectional view taken on line 10—10 of Fig. 9, Figure 11 is a horizontal sectional view taken on line 11—11 of Fig. 9, Figure 12 is a vertical sectional view taken on line 12—12 of Fig. 10, Figure 13 is a vertical sectional view taken on line 13—13 of Fig. 9, Figure 14 is a vertical sectional view taken on line 14—14 of Fig. 8, Figure 15 is a vertical sectional view taken on line 15—15 of Fig. 14, Figure 16 is a fragmentary sectional view taken on line 16—16 of Fig. 1, Figure 17 is a fragmentary sectional view taken on line 17—17 of Fig. 1, Figure 18 is a fragmentary sectional view taken on line 18—18 of Fig. 1, Figure 19 is an enlarged vertical sectional view of the valve illustrated in Fig. 17, Figure 20 is a fragmentary sectional view taken on line 20—20 of Fig. 19, Figure 21 is an enlarged vertical sectional view of the valve operating mechanism illustrated in Fig. 19, Figure 22 is a side elevational view of the control assembly for regulating the timing of the operation of the washing jig, Figure 23 is a horizontal sectional view taken on line 23—23 of Fig. 22, Figure 24 is a vertical sectional view taken on line 24—24 of Fig. 23, Figure 25 is a vertical sectional view taken on line 25—25 of Fig. 24, Figure 26 is a fragmentary sectional view showing the manner in which the switch operating magnets are mounted on the rotating discs of the timing control assembly, Figure 27 is a fragmentary sectional view taken on line 27—27 of Fig. 26, Figure 28 is a fragmentary top plan view of one of the movably mounted switches of the timing control assembly, Figure 29 is a fragmentary top plan view of one of the stationary switches of the timing control assembly, Figure 30 is a wiring diagram of the electrical circuits employed in the timing control assembly, and Figures 31a and 31b are diagrammatic views which collectively illustrate the entire control system of the washing jig.

Figure 2:
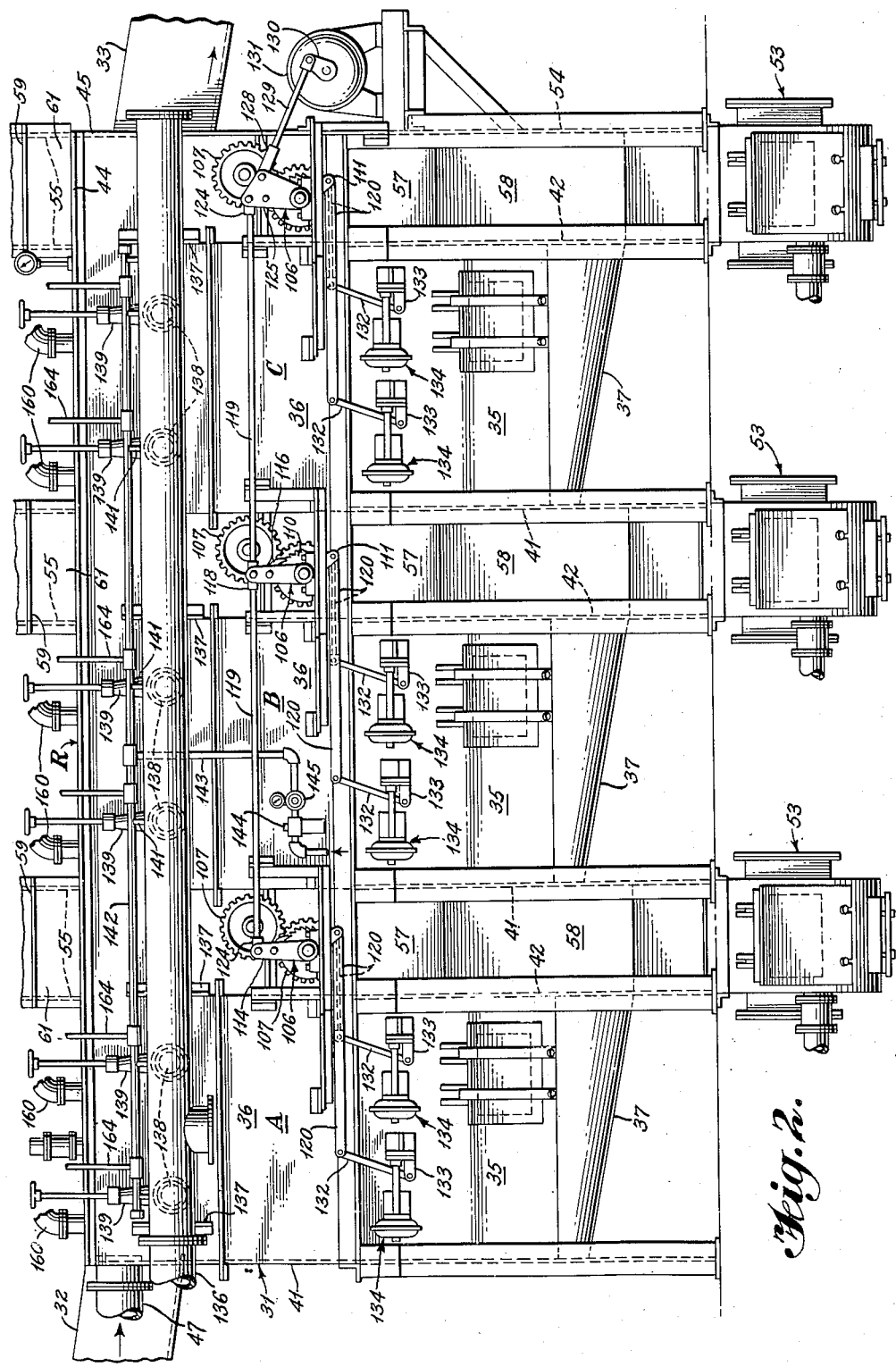
Figure 2 is a side elevational view of the jig illustrated in Fig. 1.

In the drawings, wherein for the purpose of illustration is shown the preferred embodiment of the invention, and first particularly referring to Figs. 1 to 3, inclusive, there is shown a washing jig which includes a wash box designated in its entirety by the reference character 31. The wash box 31 is divided into a feed compartment A, an intermediate compartment B and an exit compartment C which are of substantially identical construction. An inlet chute 32 is provided for introducing material to the outer end of the feed compartment A and an outlet chute 33 is provided for receiving material from the outer end of the exit compartment C. It will be noted that the inlet chute 32 is at an elevation slightly above that of the outlet chute 33 to prevent any tendency for the material in the wash box to wash back into the inlet chute during operation of the device.

Since the three compartments A, B and C are of substantially identical construction, the following detail description of the intermediate compartment B applies equally to the compartments A and C and for that reason the latter compartments will not be described in detail. A longitudinally extending vertical partition 34 is centered in the compartment B and divides the latter into chambers Ba and Bb which lie on opposite sides of the partition. Each of the chambers Ba and Bb is provided with a curved bottom 35 between the partition 34 and the outer wall 36 of the wash box 31. A trough 37 extends longitudinally of each bottom 35 and is inclined downwardly toward the exit end of the wash box 31.

Mounted in the chamber Ba is a longitudinally extending partition 38 which divides its upper portion into an inner section Ba1 and an outer section Ba2. The chamber Bb is similarly divided by a partition 38 into an inner section Bb1 and an outer section Bb2. It will be noted that the tops of the partitions 34 and 38 and the outer walls 36 are horizontally aligned and that the bottom edges of the partitions 38 are spaced vertically from the bottom 35 of their associated chambers Ba and Bb so that the inner and outer sections Ba1 and Ba2 and Bb1 and Bb2 of chambers Ba and Bb, respectively, are in open communication beneath the bottom edges of the partitions 38.

Mounted in the inner sections Ba1 and Bb1 of the chambers Ba and Bb, respectively, are a pair of material bed supporting screen structures 39 which are of conventional construction and slope downwardly from the feed end wall 41 to the exit end wall 42 of the compartment B. A chambered cover is provided for each outer section Ba2 and Bb2 by vertically spaced horizontal plates 43 and 44 which extend throughout the entire length of the wash box 31 between the partitions 38 and the adjacent outer walls 36. The spaces between the plates 43 and 44 are closed at the exit end of the wash box 31 by end plates 45 and at the inlet end of the box by end plates 46 to provide a longitudinally extending reservoir R at the top and at each side of the wash box. Air is admitted to each reservoir R through an air inlet pipe 47 from any suitable supply source.

The inner and outer sections Ba1 and Ba2 of the chamber Ba are divided into a pair of cells Ba3 and Ba4 by a laterally extending partition 48 and a similar partition 48 divides the inner and outer sections Bb1 and Bb2 of the chamber Bb into a pair of cells Bb3 and Bb4. Each of the partitions 48 has its upper edge positioned adjacent the screen 39 and plate 43 of its associated chamber Ba or Bb and extends downwardly therefrom to the bottom 35, an opening 49 being provided above the trough 37, as illustrated in Figs. 4 and 5. The exit end wall 42 is provided with similar openings 51 above the trough 37 of each of its associated chambers Ba and Bb, as illustrated in Figs. 4 and 6, for a purpose that will be later described.

As was previously mentioned, the compartments A and C are substantially identical in construction to the compartment B and corresponding reference characters have been applied to all of the compartments. Compartment A, therefore, is divided by its partition 34 into chambers Aa and Ab having inner and outer sections Aa1—Aa2 and Ab1—Ab2, respectively. Further, the chambers Aa and Ab are divided into cells Aa3—Aa4 and Ab3—Ab4, respectively, by laterally extending partitions 48. The exit end compartment C is similarly divided into chambers Ca and Cb having inner and outer sections Ca1—Ca2 and Cb1—Cb2, respectively, and cells Ca3—Ca4 and Cb3—Cb4, respectively.

As is best illustrated in Figs. 4 and 7, each of the compartments A, B and C has associated with its discharge end portion a refuse draw 52 and an elevator assembly 53. The refuse draws 52 and elevator assemblies 53 of the three compartments A, B and C are of identical construction and will not be separately described. It will be noted, however, that the exit end plates 42 and inlet end plates 41 of the adjacent compartments A—B and B—C form portions of the housings for the elevator assemblies associated with the compartments A and B. The elevator assembly 53 associated with the exit end compartments C, on the other hand, is housed between the exit end plate 42 of this compartment and the end plate 54 of the wash box 31. With this single exception, corresponding reference characters have been applied to the same parts of both the refuse draw 52 and the elevator assembly 53 for each of the three compartments.

Referring now to Figs. 4 and 7 it will be seen that the refuse draw 52 and the elevator assembly 53 associated with the compartment B are housed between the exit end plate 42 of the compartment B and the inlet end plate 41 of the compartment C which are spaced longitudinally and extend downwardly below the bottoms 37 of their associated compartments. Each of the plates 42 and 41 is also provided with a portion 55 which projects upwardly and laterally outwardly from one side of the wash box 31. As is best illustrated in Fig. 7, the space between the plates 41 and 42 is enclosed by a plate 56 which is arranged in longitudinal alignment with the partitions 38 of the chambers Bb and Cb, a plate 57 which extends downwardly and outwardly from the bottom edge of the plate 56, and a curved plate 58 which extends downwardly and inwardly from the lower edge of the plate 57 around the bottom of the elevator assembly 53 and upwardly and laterally outwardly along the projecting portions 55.

As illustrated in Fig. 3, a housing assembly 59 is mounted on the top edges of the projecting portions 55 with its inner side 61 abutting the outer edge of the adjacent plate 44. It will be noted that the plate 43 is notched between the spaced end plates 42 and 41 to provide clearance for movement of the elevator assembly 53 as will be later described. A vertical plate 62, therefore, extends between and connects the plates 43 and 44 between the end plates 42 and 41 so that the compressed air reservoir remains continuous throughout the length of the wash box 31.

A vertical plate 63 is mounted between the spaced end plates 42 and 41 in longitudinal alignment with the partitions 38 of the chambers Ba and Ca and a deflector plate 64 extends downwardly and inwardly from the bottom edge of the plate 63 for a purpose that will be later described. A substantially horizontally arranged sluice plate 65 extends laterally between the plates 63 and 56 and longitudinally between the spaced end plates 42 and 41 at an elevation above that of the screens 39 of the adjacent compartments B and C. The portions of the spaced end plates 42 and 41 between the plates 63 and 56 and above the sluice plate 65 are removed and a vertically arranged partition 66 extends between and connects the partitions 34 of the adjacent compartments B and C above the sluice plate.

As illustrated in Fig. 4, the discharge end plate 42 is provided with a laterally extending discharge opening 67 adjacent the refuse draw 52 of the associated compartment B. A weir plate 68 is mounted on the edge of the sluice plate 65 adjacent compartment B and extends vertically upwardly therefrom. Separate gates 69 are mounted for vertical movement across the two portions of the opening 67 at the discharge ends of the screens 39 in compartment B to independently vary the heights of the two portions of the opening.

Referring to Figs. 4 and 7, it will be seen that the elevator assembly 53 consists of a conventional bucket elevator including buckets 71 that are carried by spaced chains 72 which travel around pulleys 73 in the bottom portion of the space between the end plates 42 and 41 and around sprockets 74 mounted in the upper portion of the housing assembly 59. As illustrated in Figs. 3 and 4, the sprockets 74 are driven by rotation of a sprocket 75 which is drivingly connected to the drive sprocket 76 mounted on the output shaft of a speed reducer unit 77 the input shaft of which is connected to a drive motor 78 through a flexible coupling 79. Operation of the motor 78, therefore, will effect movement of the buckets 71 through inclined paths along one side of the wash box 31.

It will be noted that the deflector plate 64 overlies the lower portion of the path of travel of the bucket 71. It will be readily apparent that material passing through the refuse draw 52 will fall into the bottom portion of the housing for the elevator assembly 53 where it will be scooped up by the buckets 71 and carried to one side of the wash box 31 where it will be dumped over the sprockets 74 into a discharge chute 80, as illustrated in Fig. 3.

Referring now to Fig. 7, it will be seen that the refuse draw 52 includes a rotary gate 81 which is positioned adjacent to and slightly below the level of the discharge end of the screen 39 in the chamber Bb and a second, identically constructed rotary gate 82 which is positioned in axial alignment with the gate 81 adjacent to and slightly below in the level of the discharge end of the screen 39 in the chamber Ba. The two gates 81 and 82 are of identical construction so that the following description of the gate 81 applies equally well to gate 82 and corresponding reference characters have been applied to the corresponding parts of each.

Referring now to Figs. 10 and 11, for a detail description of the rotary gate 81, it will be noted that the gate is provided with a shaft 83 and is divided longitudinally into an inner section D and an outer section E which are of equal length and are separated from each other by a radially arranged disc 84, additional discs 84 being mounted at the opposite end portions of the gate.

Mounted between the discs 84 of each of the gate sections D and E are four vanes 85 which extend radially outwardly from the shaft 83, the angular spacing between adjacent vanes of each gate section being equal. The vanes 85 of each gate section D, however, are displaced through an angle of 45° relative to the vanes of the adjacent section E, as illustrated in Figs. 9 and 12.

As is best illustrated in Figs. 10, 11 and 12, the adjacent inner end portions of the shafts 83 of the two gates 81 and 82 are journaled in a split bearing 86 which is supported on a bracket 87 that is mounted between the discharge end plate 42 of the compartment B and the end plate 41 of the compartment C in longitudinal alignment with the partitions 34 of the two compartments. The outer end portions of the shafts 83 of the two gates 81 and 82 are journaled in split bearings 88 and 89 which are mounted on the vertical plates 56 and 63, respectively. The bearing 88 includes a packing gland 90 which is arranged outwardly of the plate 56 to prevent the escape of water as will be later described. It will also be noted that the outer ends of the shafts 83 of the gates 81 and 82 are provided with the end slots 91, as illustrated in Fig. 10, by means of which rotary motion may be independently imparted to the two gates.

As is best illustrated in Fig. 9, two plates 92 each having a curvature corresponding to that of the periphery of the discs 84 are mounted on the exit end plate 42 beneath the two portions of the opening 67 at the discharge ends of the two screens 39 in compartment B so that a plate is positioned adjacent each of the rotary gates 81 and 82. The arc of each plate 92 spans an angle greater than the 90° angle between adjacent vanes 85 on the associated gate 81 or 82 so that one of the vanes of each gate section D and E will at all times lie opposite the plate. Material passing through the opening 67, therefore, cannot pass through the refuse draw 52 between the plates 92 and the gates 81 and 82.

Mounted in overlying relationship with each gate 81 and 82 is a cover plate 93 one edge portion of which is pivotally suspended from the sluice plate 65 by brackets 94. The opposite edge portion of each plate 93 is shaped to conform with the curvature of the associated gate 81 or 82 and is suspended in closely spaced relationship with the gate by a chain 95, the upper end of which is adjustably connected to the sluice plate 65. Each plate 93, therefore, will normally hang in closely spaced relationship with its associated gate 81 or 82 but is free to partake of pivotal movement when material between the vanes 85 of the gate binds against and lifts the curved portion of the plate.

Mounted on and extending downwardly from the sluice plate 65 adjacent the outer ends of the two cover plates 93 are a pair of guard plates 96, the lower edges of which are arcuately formed and are spaced closely adjacent to the discs 84 at the outer ends of the two gates 81 and 82. Additional guard plates 96 are mounted on and extend downwardly from the sluice plate 65 adjacent the inner ends of the two cover plates 93 and with their arcuately formed lower edges spaced closely adjacent to the discs 84 at the inner ends of the two gates 81 and 82. These guard plates 96, therefore, will prevent the spillage of material through the opening 67 onto the journals 86, 88 and 89.

As is best illustrated in Figs. 9 and 10, additional bearings 88 and 89 are mounted on the plates 56 and 63, respectively, for supporting a countershaft 97 in spaced parallel relationship with the axially aligned shafts 83 of the two gates 81 and 82. The opposite ends of the countershaft 97 are provided with slots 98 by means of which rotary motion may be transmitted to and from the countershaft. The countershaft 97 is drivingly connected to the shaft 83 of the gate 82 by a pair of identical gears 99 which are supported in meshing relationship by stub shafts 100. Each of the stub shafts 100 is keyed to its associated gear 99 and has its opposite end portions supported by an associated one of the bearings 89 and by a spaced bearing 101. The end of each stub shaft 100 adjacent its associated shaft 83 or countershaft 97 is provided with a lug 103 for engaging the slot 91 or 98 of the associated shaft so that when the countershaft 97 is rotated this rotary motion will be transmitted through the stub shafts 100 and gears 99 to the shaft 83 of the gate 82.

As is best illustrated in Fig. 10, a drive shaft 102 is journaled in the bearing 88 which supports the outer end of the shaft 83 for the gate 81 and is provided with a lug 103 which is positioned in the slot 91 so that rotation of the drive shaft will impart rotary movement to the gate. A second drive shaft 104 is supported by the bearing 88 for the countershaft 97 and is provided with a lug 105 which engages the slot 98 at the adjacent end of the countershaft so that rotation of the drive shaft 104 will impart rotary movement to the countershaft and in urn to the rotary gate 82.

Referring now to Figs. 8, 14 and 15 for a detail description of the drives for rotating the drive shafts 102 and 104 of the rotary gates 81 and 82 for the three compartments A, B and C, it will be noted that each of the shafts 102 has mounted thereon a pawl and ratchet assembly, designated in its entirety by the reference character 106, and that each of the shafts 104 is connected through a pair of meshing gears 107 to a sleeve 108 which is supported for rotation on the shaft 102 and is also provided with a pawl and ratchet assembly 109. It will be readily apparent that rotation of the sleeve 108 by its pawl and ratchet assembly 109 independently of the rotation of the shaft 102 by its pawl and ratchet assembly 106 will act through the gears 107, drive shaft 104 and countershaft 97 to impart rotation to the gate 82 which is independent of that of the gate 81.

Referring particularly to Figs. 14 and 15 for a detail description of the pawl and ratchet assemblies 106 and 109 for the drive shafts 102 and 104 associated with gates 81 and 82 of compartment B, it will be noted that the assembly 106 includes a ratchet wheel 110 which is keyed to the shaft 102 between axially spaced arms 111. The arms 111 extend diametrically across the ratchet wheel 110 and are connected at one side of the wheel by a pin 112 and at the other side of the wheel by a cover plate 113 which is arranged in closely spaced relationship with and extends along a portion of the periphery of the ratchet wheel. Rotatably supported on the shaft 102 adjacent and outwardly of the two arms 111 are a pair of side plates 114 which extend radially outwardly from the shaft 102 and are connected at a radius greater than that of the cover plate 113 by a pin 115 upon which is pivotally mounted a pawl 116 the outer end of which is weighted to urge the pawl into driving engagement with the toothed periphery of the ratchet wheel 110. Radially outwardly of the pawl 116, the side plates 114 are connected by a second pin 117 which passes through a coupling member 118 to pivotally connect the coupling member to the side plates.

Extending in opposite longitudinal directions from the coupling member 118 are a pair of connecting rods 119 which are movable, as will be later described, to impart reciprocatory motion to the side plates 114. This reciprocatory movement of the sides plates 114 will move the pawl 116 through an arcuate path along the periphery of the ratchet wheel 110 to impart a step by step rotary motion to the ratchet wheel and to the shaft 102 upon which it is mounted. The extent to which the ratchet wheel 110 and shaft 102 are rotated by each oscillation of the pawl 116, however, may be varied by rotation of the arms 111 to position the cover plate 113 at different locations along the periphery of the ratchet wheel so that the pawl will be lifted from engagement with the ratchet wheel during varying portions of its oscillating movement.

This rotation of the arms 111 is effected by an operating rod 120 which is pivotally connected to the pin 112 and the movement of which to adjust the position of the cover plate 113 will be later described.

By reference to Fig. 15 it will be seen that the pawl and ratchet assembly 109 is identical to the pawl and ratchet assembly 106 except that its ratchet wheel 121 is formed integrally with the sleeve 108 and the arms 122 and side plates 123 are rotatably supported on the sleeve 108 rather than on the shaft 102. In all other respects, the pawl and ratchet assemblies 109 and 106 are identical and corresponding reference characters have been applied to the corresponding parts of each so that no further description of the pawl and ratchet assembly 109 will be given.

By reference to Fig. 2, it will be noted that the pawl and ratchet assemblies 106 and 109 associated with compartment A have coupling members 124 at the outer ends of their side plates 114 and 123 which are each secured to one of the connecting rods 119 and through the connecting rods 119 to the coupling members 118 of the assemblies 106 and 109, respectively, associated with the compartment B. All of the other elements of the pawl and ratchet assemblies 106 and 109 associated with the compartment A are identical to those previously described in connection with the pawl and ratchet assemblies associated with the compartment B and have been given corresponding reference numbers.

By reference to Figs. 8 and 14, it will also be noted that the pawl and ratchet assemblies 106 and 109 associated with compartment C are provided with coupling members 124 which are fastened to the other connecting links 119 and through the connecting links to the side plates 114 and 123 of the assemblies 106 and 109 associated with the compartment B. Further, the side plates 125 and 126 of the pawl and ratchet assemblies 106 and 109 associated with the compartment C have their outer end portions broadened for receiving pins 127 which have coupling members 128 mounted thereon for connecting the side plates of the two assemblies to a drive link 129. All of the remaining elements of the pawl and ratchet assemblies 106 and 109 associated with the compartment C are identical to the previously described elements of the assemblies associated with the compartment B and have been given corresponding reference characters.

As illustrated in Fig. 8, the drive link 129 is pivotally connected to the outer end of an eccentric 130 carried by the shaft of a motorized speed reducer unit 131 so that the operation of the speed reducer unit will impart reciprocatory movement to the side plates 125 and 126 of the pawl and ratchet assemblies 106 and 109, respectively, associated with compartment C and to the connected side plates 114 and 123 of the pawl and ratchet assemblies 106 and 109, respectively, associated with the compartments A and B. It will be readily apparent that this reciprocatory movement of the various side plates 125, 126, 114 and 123 will move the associated pawls 116 through arcuate paths of equal length and will impart step by step rotary motion to the various ratchet wheels 110 and 121 at a variable rate in accordance with the positions of the cover plates 113 of the various pawl and ratchet assemblies. In other words, the step by step rotary motion of each of the gates 81 and 82 of each of the compartments A, B and C may be independently adjusted to vary the rate of discharge of material from the chambers Aa, Ab, Ba, Bb, Ca and Cb of the wash box 31.

The independent adjustment of the operating rod 120 for each of the pawl and ratchet assemblies 106 and 109 is accomplished by properly positioning a lever 132 the opposite ends of which are pivotally connected to the operating rod and to a stationary bracket 133 mounted on the side 35 of the associated compartment A, B or C, as illustrated in Fig. 2. Each of the levers 132 is controlled in accordance with the operation of a different positioning device 134 which forms a portion of a discharge control system to be more fully described at a later point and which is fully disclosed in the copending application of Clarence M. Kazmier and Walter Carlson, Serial No. 547,479, filed November 17, 1955, and entitled "Wash Box Discharge Control."

As illustrated in Figs. 1 to 3, inclusive, the wash box 31 has mounted on each of its outer walls 36 a header 136 which extends longitudinally of the wash box and is supported on its associated side wall by brackets 137. Each of the headers 136 is connected to a suitable source of supply of water, not shown. It will be noted from Fig. 3 that one of the headers 136 passes between the two runs of the chains 72 of the bucket elevator assembly 53. Branch pipes 138 connect the header 136 on one side of the wash box 31 to its adjacent cells $Aa3$, $Aa4$, $Ba3$, $Ba4$, $Ca3$ and $Ca4$ and the header on the other side of the wash box to its adjacent cells $Ab3$, $Ab4$, $Bb3$, $Bb4$, $Cb3$ and $Cb4$, as illustrated in Fig. 16. Each of the branch pipes 138 is provided with a manually operated valve 139 for controlling the flow of water from the header 136 through its associated branch pipes.

Mounted on each of the headers 136 by means of supporting bracket 141 is a header 142 which is connected to a suitable source of supply of compressed air, not shown, through a pipe 143. As illustrated in Fig. 2, the compressed air entering the header 142 through its associated pipe 143 passes through a trap or filter 144 and a pressure regulating valve 145 so that the air within each header is maintained at a substantially constant pressure. Each of the pipes 143 is supported on the adjacent side wall 36 of the wash box 31 by a bracket 146, see Fig. 18.

As illustrated in Fig. 1, each one of the cells $Aa3$, $Aa4$, $Ba3$, $Ba4$, $Ca3$, and $Ca4$ on one side of the wash box 31 is provided with air control valves 147 to 152, respectively, and the cells $Ab3$, $Ab4$, $Bb3$, $Bb4$, $Cb3$, and $Cb4$ on the opposite side of the wash box are provided with similar but oppositely arranged valves 153 to 158, respectively. Each one of these air control valves 147 to 158 is mounted in a centrally located position on the portion of the plate 44 overlying the associated cell and, as illustrated in connection with valve 155 in Fig. 17, the inlet of each valve is connected through a blast valve 159 and pipe 160 to the adjacent compressed air reservoir R and the outlet of each valve communicates with the upper portion of the outer section of its associated cell through a pipe 161 which extends downwardly through the plates 43 and 44.

Each of the valves 147 to 158, inclusive, is operated by an air motor 162 mounted on the upper portion of its associated valve and the operation of which will be later described. Each of the air motors 162 is connected through a control valve 163 and branch line 164 to the compressed air header 142 on the adjacent side of the wash box 31.

Referring now to Figs. 19 and 20 for a detail description of the valve 155 which is identical in construction with the remaining air control valves 147 to 154, inclusive, and 156 to 158, inclusive, it will be noted that the cylindrical body 165 of the valve has a flanged base 166 which is secured to the flange 167 at the upper end of the outlet pipe 161 so that the pipe is in open communication with the interior of the valve body. Spaced upwardly from the flange 166 is an annular manifold 168 having an opening on one side thereof surrounded by a flange 169 for connection with the flange 171 of the valve 159 to permit the free flow of air from the valve into the manifold. An inlet opening 172 extends completely around the valve body 165 for admitting air from the manifold 168 into the interior of the valve body. The portion of the valve body 165 above the manifold 168 has formed therein two vertically spaced annular vent openings 173 with the portions of the valve body located above and below each vent opening being formed of a rigid and continuous structure through the radially arranged fins 174 which surround the valve body.

Mounted for vertical movement within and in sliding engagement with the bore of the body member 165 is a sleeve 175 which is connected through radially inwardly extending vanes 176 to a collar 177 that is secured to the operating rod 178. The rod 178 extends upwardly from the collar 177 through and in sliding engagement with the opening 179 in the cap 181 at the upper end of the valve body 165. The sleeve 175 has formed therein an annular vent 182 which extends completely around, and is spaced from the upper end of, the sleeve by a distance equal to the spacing between the vent openings 173 of the valve body 165. The portions of the sleeve 175 located above and below the vent opening 182 are united through the vanes 176 which connect the sleeve to the collar 177.

By reference to Fig. 19, it will be readily apparent that when the sleeve 175 is moved to partially or completely align the vent opening 182 with the lower vent opening 173, the upper vent opening 173 will be opened above the upper end of the sleeve 175 to the same extent that the opening 182 is aligned with the lower vent opening and the pipe 161 will be in open communication with the atmosphere through the aligned vent openings 182 and 173 and the upper vent opening 173, the inlet opening 172 being closed by the lower portion of the sleeve. When the sleeve 175 is moved upwardly, however, both of the vent openings 173 will be closed by the portions of the sleeve located above and below the opening 182 and the inlet opening 172 will be partially or completely opened to provide communication between the inlet pipe 159 and the outlet pipe 161. The extent to which the vent openings 173 and inlet opening 172 are opened at the two limits of travel of the sleeve 175 is determined by engagement between the stop collar 183, which surrounds the operating rod 178, and the spaced annular flanges 184 on the operating rod. As illustrated in Fig. 20, the stop collar 183 is adjustably mounted on the cap 181 by two connecting members 185.

On the top of the cap 181 there is provided a cylindrical housing 186 for the upper end portion of the operating rod 178. The upper end portion of the housing 186 is internally flanged at 187 for receiving the end plate 188 which is secured thereto and is provided with a centrally located aperture 189 through which the operating plunger 191 of the air motor 162 extends for threaded connection with the upper end of the operating rod 178. The threaded connection between the plunger 191 and the operating rod 178 permits adjustment of the position of the sleeve 175 relative to a given position of the plunger. When the stop collar 183 is adjusted to vary the extent to which the vent openings 173 and the inlet opening 172 are opened at the limits of travel of the sleeve 175, therefore, the threaded connection between the plunger and the operating rod may also be adjusted to maintain the end positions in the movements of the plunger at their initial locations. The flanged end 192 of the air motor 162 is secured to the plate 188 to mount the air motor on the plate.

Referring now to Fig. 21 for a detail description of the air motor 162 and its associated control valve 163, it will be noted that the motor is provided with a cylindrical body member 193, the opposite ends of which are seated in sealing relationship with circular grooves 194 and 195 in the flanged end 192 and in the cap 196, respectively. A bypass tube 197 is also positioned between the flanged end 192 and the cap 196 outwardly of the housing 193 with its opposite end portions seated in sealing relationship with the flanged end and cap. Threaded connecting members 198 extend between and connect the flanged end 192 and cap 196 to hold the housing 193 and tube 197 in the aforesaid sealed relationship between the flanged end and cap.

The operating plunger 191 extends through a bushing 199 carried by the flanged end 192 and through an annular sealing member 201 that is clamped between the bushing and the flanged end to prevent the escape of air from within the housing 193. Connected to the end of the operating plunger 191 within the housing 193 is a piston 202 which is provided with two flexible discs 203 and 204, the marginal portions of which are deflected axially in opposite directions for engagement with the inner surface of the housing 193 to prevent the escape of air in either direction past the piston 202. Within the flanged end 192, there is provided a passageway 205 which communicates with one end of the bypass tube 197 and with the space between the piston 202 and the flanged end for the free flow of air from the tube into the space. The opposite end of the bypass tube 197 is aligned with a passageway 206 in the cap 196 and a second passageway 207 in the cap extends from the space between the piston 202 and the cap, the outer ends of the two passageways 206 and 207 opening outwardly from the cap.

Mounted on the cap 196 with its inner surface in sealing engagement therewith is a block 208 having passageways 209 and 211 extending therethrough in alignment with the passageways 206 and 207, respectively, of the cap. A second set of passageways 212 and 213 are arranged adjacent the passageways 209 and 211, respectively, and extend from the outer surface of the block 208 to vent openings in the side of the block. Threaded through a plate 214 on one side of the block 208 are a pair of regulating screws 215 and 216 which are adjustable to variably restrict the passageways 212 and 213, respectively, and to thereby vary the rate of flow of gas through the passageways.

The control valve 163 is mounted on and in sealing engagement with the outer surface of the block 208 and is provided with a valve element 217 which slidably engages the outer surface of the block and is movable between alternate positions at which one of the passageways 209 or 211 is placed in open communication with the space within the control valve body 218 and the other passageway is placed in communication with its associated passageway 212 or 213. The branch pipe 164 which leads to the compressed air header 142 is connected to the body 218 of the control valve 163 for introducing compressed air to the space within the body for flow from said body into the passageway 209 or 211, whichever is in communication with the space.

It will be readily apparent, therefore, that when the slide valve 217 is so positioned that the passageway 211 communicates with the space within the control valve body 218, air will flow through the passageways 211 and 207 into the space between the piston 202 and cap 196 of the air motor 162. Simultaneously, air will flow through the passageway 205 in the flanged end 192 and through the bypass tube 197 and passageways 206 and 209 to the passageway 212 from which it is released at an adjustable rate in accordance with the setting of the regulating screw 215. The piston 202, therefore, will move in a downward direction to the extent permitted by the stop collar 183 and at a rate that may be varied by adjusting the setting of the regulating screw 215. When the slide valve 217 is moved to its alternate position at which the passageway 209 communicates with the space within the control valve body 218, and the passageway 211 communicates with its associated passageway 213, air will be admitted through the passageways 209 and 206, the bypass tube 197 and passageway 205 into the space between the piston 202 and the flanged end 192. Simultaneously, air will be released from the space between the piston 202 and the cap 196 through the passageways 207, 211 and 213 at an adjustable rate in accordance with the setting of the regulating screw 216. The piston 202 will thereupon move in an upward direction to the extent permitted by the stop collar 183 and at a rate in accordance with the setting of the regulating screw 216.

The slide valve 217 is moved between its alternate positions by a piston 219, the middle portion of which engages a pin 220 carried by the slide valve 217 and the opposite end portions of which slidingly engage the bores of cylinders 221 that are formed in the opposite end portions of the control valve body 218. Mounted on the ends of the control valve body 218 are caps 222, the caps at the opposite ends of the body having mounted thereon solenoids 223 and 224 which extend into the cylinders 221 within the hollow ends of the piston 219. Each of the solenoids 223 and 224 is provided with a plunger 225 which carries a piston 226 that is fitted into a vent opening 227 in its associated end cap 222. Extending from the side of each vent opening 227, and normally covered by the piston 226 therein, is a passageway 228 which communicates with the space within the associated cylinder 221. Alternate movement of the plunger 225 and piston 226 of each of the two solenoids 223 and 224 to uncover the outer ends of their associated passageways 228, therefore, will permit the escape of gases from within alternate cylinders 221 through the vent openings 227.

The middle portion of the piston 219 between its hollow end portions has formed therearound an annular groove 229 through which compressed air flows from the pipe 164 to the slide valve 217 for admission to the passageway 209 or 211, in accordance with the position of the valve. Extending through the middle portion of the piston 219, between its hollow end portions, is a passageway 230 having positioned therein a ball check valve 231 which is retained in the passageway by annular valve seats 232 arranged on opposite sides of the valve and spaced to permit alternate movement of the valve into sealing engagement with the seats on opposite sides thereof.

The operation of the valve 163 in controlling the air motor 162 will be described in detail as follows:

As illustrated in Fig. 21, the slide valve 217 is positioned to permit the flow of air from the branch pipe 164 around the groove 229 in the piston 219 and into the passageway 211 of the block 208. This air will then flow through the passageway 207 into the space between the piston 202 and the cap 196 of the air motor 162 to initiate movement of the piston from the position illustrated in a downward direction. The rate of movement of the piston 202 will, of course, vary in accordance with the rate of flow of the air from the space between the piston and the flanged end 192 of the air motor 162 through the passageway 205, bypass tube 197, passageway 206, and passageways 209 and 212 in the block 208. Since the flow of gas from the passageway 212 is controlled by adjustment of the regulating screw 215, the rate of movement of the piston 202 in a downward direction will be controlled by the setting of this screw. The extent of downward movement of the piston 202 will be limited by engagement between the stop collar 183 and the upper flange 184 on the operating rod 178 of the valve 155.

To effect the return of the piston 202 to its uppermost position, illustrated in Fig. 21, it will be necessary to reposition the slide valve 217 so that air will flow from the branch pipe 164 through the groove 229 and into the passageway 209 of block 208. This repositioning of the slide valve 217 will also place the passageway 211 in communication with the passageway 213 so that compressed air will flow from the passageway 209 into the space between the piston 202 and the flanged end 192 through the passageway 206, bypass tube 197 and passageway 205 and will be released from the space between the piston and the cap 196 through the passageway 207, passageway 211 and passageway 213. The rate of movement of the piston, of course, will depend upon the rate of flow of the gas through the passageway 213 and may be controlled by adjusting the position of the regulating screw 216. The extent of upward movement of the piston 202 will be limited by engagement between the stop collar 183 and the lower flange 184 on the operating rod 178 of the valve 155.

Movement of the slide valve 217 between its alternate positions is effected by alternately energizing the solenoids 223 and 224 in the opposite end portions of the control valve 163. The solenoids 223 and 224 are independently energized by the flow of current through the leads 233 and 234, respectively, at opposite ends of the control valve 163, each of the solenoids being grounded through the air motor 162 and valve 155 to the frame of the wash box 31. When either of the solenoids 223 or 224 is energized by the flow of current through the associated conductor 233 or 234, its plunger 225 will be retracted to move the piston 226 carried thereby to a position at which air will be released from the adjacent cylinder 221 through the associated passageway 228 and vent opening 227.

Assuming, therefore, that the slide valve 217 has been positioned as illustrated in Fig. 21 and that the piston 202 has reached the lower end point of its path of travel, the pressure within the cylinders 221 at opposite ends of the control valve 163 will have been equalized by movement of the ball check valve 231 away from its right-hand valve seat 232 when the check valve engages the inner end of the solenoid 223. The pressure within the two cylinders 221 will also be at a value above atmospheric pressure due to the retarded flow of air between the closely fitted opposing surfaces of the piston 219 and the cylinders. A momentary flow of current through the conductor 234 of the solenoid 224 will thereafter release the air from the associated cylinder 221 through its passageway 228 and venting port 227 at a much greater rate than air is permitted to flow into the cylinder so that the pressure of the air in the groove 229 and within the cylinder 222 at the opposite end of the control valve 163 will act to move the piston to the left and will reposition the slide valve 217.

During the movement of the piston 219 to reposition the slide valve 217, the ball check valve 231 will be held in sealing engagement with its left-hand valve seat 232 by the pressure of the air within the right-hand cylinder 221. As the piston 219 approaches the end point of its travel to the left, however, the ball check valve 231 will engage the inner end of the solenoid 224 to equalize the pressures in the two cylinders 221 and to cushion the impact between the piston and the inner end of the solenoid. When the piston 219 has been stopped, however, the ball check valve 231 will have been moved into sealing engagement with the valve seat 232 on the right-hand side of the valve to condition the piston for subsequent movement in the opposite direction.

The piston 219 will remain in the position to which it is moved, as described above, until the solenoid 223 is energized by the momentary flow of current through the lead 233 at which time the piston will move to the position illustrated in Fig. 21. By reference to Figs. 19 and 21, it will be readily apparent that a momentary flow of current through the lead 233 will cause the associated one of the valves 147 to 158, inclusive, to be moved to a position at which air is vented from the cell associated with the valve and a momentary flow of current through the lead 234 will cause the valve to admit compressed air from the reservoir R to the cell.

Referring now to Figs. 22 to 25, inclusive, for a detail description of the timing mechanism employed in the control system, and first particularly referring to Fig. 22, there is shown a housing 235 which is mounted on a suitably reinforced supporting structure 236 that may be positioned at any convenient location near the wash box 31. Mounted on a shelf 237 at one end of the supporting structure 236 is the variable speed transmission unit 238 driven by a motor 239 and having its output shaft 241 aligned with one end of the housing 235.

As is best illustrated in Fig. 23, a shaft 242 is mounted within and extends longitudinally of the housing 235. The shaft 242 is supported for rotation by axially spaced bearings 243 and one end portion of the shaft extends through the end of the housing 235 in alignment with the output shaft 241 of the variable speed transmission unit 238, the adjacent end portions of the two shafts being connected by a flexible coupling 244.

Rigidly mounted on the shaft 242 for rotation therewith are twelve axially spaced discs which are designated consecutively 245 to 256, inclusive, from left to right, as viewed in Fig. 23. Each of the discs 245 to 256, inclusive, is formed of Bakelite or other non-conductive material and has mounted on one side thereof two pairs of permanent magnets 257 which are arranged at two diametrically opposed points adjacent the periphery of the disc. As illustrated in Figs. 26 and 27, the magnets 257 of each pair are arranged in side-by-side relationship with their opposite poles adjacent each other and are secured against the side of the associated disc, for example 245, by plates 258 which are secured to each other by screws 259.

The relative locations of the magnets 257 associated with the discs 245 to 256, inclusive, are not illustrated but can best be described by first noting that discs 245 to 248, inclusive, form a part of the control section for the compartment A of wash box 31; discs 249 to 252, inclusive, form a part of the control section for compartment B; and discs 253 to 256, inclusive, form a part of the control section for compartment C.

Considering first the discs 245 to 248 of the control section for the compartment A, the magnets 257 associated with the disc 246 are displaced through an angle of ninety degrees relative to the positions of the magnets associated with the disc 245 and the discs 247 and 248 have their magnets aligned with the magnets of the disc 246.

The discs 249 to 252, inclusive, of the control section for the compartment B have their magnets 257 arranged in the same positions relative to each other as the discs 245 to 248, inclusive, of the control section for the compartment A but all of the successively numbered discs of the control section for the compartment B are displaced through an angle of substantially ninety degrees relative to the corresponding, successively numbered discs of the control secton for compartment A.

The magnets 257 on the discs 253 to 256, inclusive, of the control section for compartment C are displaced relative to each other in the same manner as those of the control sections for compartments A and B but are displaced relative to the magnets of the corresponding discs 249 to 252, inclusive, of the control section for compartment B through an angle of substantially ninety degrees and are substantially in alignment with the magnets of the discs 245 to 248, inclusive, of the control section for compartment A.

A longitudinally extending vertical partition 261 is mounted in the housing 235 in spaced relationship with the peripheries of the discs 245 to 256, inclusive. Mounted on the partition 261 in radial alignment with the path of movement of the magnets 257 associated with the discs 245, 249 and 253 are three stationary clips 262. Positioned in the clip 262 opposite the path of travel of the magnets 257 associated with the disc 245 is a mercury switch 263 of a type which is normally open and which is closed by displacement of a contact element of the switch into engagement with the mercury therein when a pair of magnets 257 are moved through a position adjacent the switch. Similar switches 264 and 265 are mounted in the clips 262 opposite the paths of movements of the magnets 257 associated with the discs 249 and 253, respectively. Separate switch mounting levers 266 are journaled on the shaft 242 adjacent each of the discs 246 to 248, inclusive, 250 to 252, inclusive, and 254 to 256, inclusive, with the free end of each lever projecting through a slot in the partition 261 for limited angular adjustment relative to the shaft.

As illustrated in Fig. 25, each lever 266 is secured in a selected position of adjustment by a bolt 267 which passes through the lever and through a slot in the bracket 268 mounted adjacent the lever on the partition 261. Mounted on each lever 266 is a bracket 269 which carries a clip 271 in radially opposed relationship with the path of movement of the magnets 257 carried by the adjacent disc. The clip 271 opposite the path of movement of the magnets 257 associated with the disc 246 has positioned therein a mercury switch 272 of the same type as switches 263 to 265, inclusive. Similar switches 273 to 277, inclusive, are mounted in the clips 271 opposing the magnets 257 carried by the dics 247, 250, 251, 254 and 255, respectively. Mercury switches 278, 279 and 280 are mounted in the clips 271 opposite the magnets 257 of the discs 248, 252 and 256, respectively, and are of a type which is normally closed and is opened by displacement of a contact element of the switch into a position out of engagement with the mercury therein when a pair of magnets 257 are moved through a position adjacent the switch. Each of the mercury switches 263 to 265, inclusive, and 272 to 280, inclusive, has its lead wires connected to a terminal bar 281, as illustrated in Fig. 25, and from the terminal bar to the various portions of the control circuit as will be later described.

Mounted on the back wall 282 of the housing 235 are nine relays which are designated in consecutive order from left to right, see Fig. 23, as R1, R2, R7, R3, R4, R8, R5, R6 and R9. Each of the relays R1 to R9, inclusive, is of a conventional type and provides a pair of contactors that are held in their closed positions by energization of a coil and are opened when the coil is de-energized. A step-down transformer 283 is also mounted within the housing 235 and it will be noted that a removable cover plate 284 is provided at the front of the housing for access to the outer ends of the mounting levers 266.

Before discussing the manner in which the relays R1 to R9, inclusive, are connected into the remainder of the control system for the wash box 31, it will be noted that the lead wires from the mercury switches 263 to 265, and 272 to 280, inclusive, are connected through the terminal bar 281 to the actuating coils of the relays as illustrated in Fig. 30. More specifically, the switches 263 to 265, inclusive, are connected in series with the coils of the relays R1, R3 and R5 through parallel branch circuits 285, 286 and 287, respectively. Switches 272, 274 and 276 are similarly connected in series with the coils of the relays R2, R4 and R6 through parallel branch circuits 288, 289 and 291, respectively. Associated pairs of normally open and normally closed switches 273 and 278, 275 and 279, and 277 and 280 are connected in series with each other and with the coils of the relays R7, R8 and R9, respectively, through parallel branch circuits 292, 293 and 294.

Since each of the discs 245 to 256, has mounted thereon two diametrically opposed pairs of magnets 257, it will be readily apparent that each revolution of the shaft 242 will cause each of the switches 263 to 265, inclusive, and 272 to 280, inclusive, to be operated twice. The relays R1 to R9, inclusive, therefore, will pass through two complete cycles of timed operation for each revolution of the shaft 242. In other words, if the shaft 242 is rotated at a speed of twenty revolutions per minute, the relays R1 to R9, inclusive, will produce forty cycles of timed operation per minute. Further, angular adjustments of the positions of the mercury switches 272 to 280, inclusive, by adjusting the positions of the levers 266, wil produce a variation in each of the timed cycles of operation which, in terms of three hundred and sixty degrees per cycle, is equal to twice the angular displacement of the lever from its horizontal position. In other words, displacement of one of the levers 266 through an angle of five degrees will produce a variation of ten degrees in each cycle of operation of the relay which is controlled by the switch carried by the lever. As illustrated in Fig. 24, index scales 295 are mounted on the outer side of the partition 261 adjacent each lever 266 to indicate the extent of variation in each cycle of operation that is produced by a given displacement of the levers 266 in either direction from their neutral positions.

Considering now the manner in which adjustments of the positions of various levers 266 specifically effects variations in the timed cycles of operation of the relays R1 to R9, inclusive, it will be recalled that the control sections for the various compartments A, B and C differ from each other only in that the magnets 257 carried by the discs of the control section for compartment B are displaced relative to the magnets of corresponding discs of the control sections for compartments A and C through an angle of substantially ninety degrees. In terms of three hundred and sixty degree cycles of timed operation of the relays R1 to R9, inclusive, this ninety degree displacement of the magnets 257 will effect a phase difference of one hundred and eighty degrees between the timed cycles of operation of the simultaneously actuated relays R1, R2 and R7; and R5, R6 and R9 of the control sections for compartments A and C and relays R3, R4 and R8 associated with the control section for compartment C. In all other respects, the following detail description of the operation of the control section for compartment A is equally applicable for the control sections for compartments B and C and will not be repeated for each individual control section.

It will be recalled that the magnets 257 carried by the two discs 245 and 246 are displaced relative to each other through angles of ninety degrees so that when the switch 272 is positioned in horizontal alignment with the switch 263, the switches 263 and 272 will be alternately closed by each ninety degrees of rotation of the shaft 242 and, therefore, at one hundred and eighty degree intervals in a cycle of operation. Under these conditions, the actuating coils of the relays R1 and R2 controlled by the switches 263 and 272 will be alternately energized with equal periods of time between the energization of successive coils. On the other hand, when the switch 272 is displaced by movement of its associated lever 266 from its neutral position in a direction opposite the direction of rotation of the shaft 242, the time interval between the energization of the relay R1 and the relay R2 is shortened and the time interval between the energization of the relay R2 and the next successive energization of the relay R1 is correspondingly lengthened. Displacement of the lever 266 supporting the switch 262 in the opposite direction from its neutral position will cause the interval between the energization of the relay R1 and the relay R2 to be increased and the time interval between the energization of the relay R2 and the next successive energization of the relay R1 to be correspondingly decreased. As was previously pointed out, the extent of angular displacement of the lever 266 supporting the switch 272 is doubled when related to the three hundred and sixty degree cycles of operation of the relays R1 and R2.

The normally open switch 273 and the normally closed switch 278 are connected in series with the actuating coil of the relay R7 and, since there is no relative angular displacement between the magnets 257 carried by the discs 247 and 248, it will be apparent that the two switches must be misaligned by relative displacement of the levers 266 carrying the switches so that the switch 273 will be closed either before or after the switch 278 is opened or no current will ever flow through the branch circuit 292 to actuate the relay R7. The portion of the period during which the switch 273 is closed that occurs either before or after the period during which the switch 278 is opened corresponds to the period of energization of the relay R7. It will be readily apparent that a very slight relative angular displacement between the switches 273 and 278 will cause the period of energization of the relay R7 to be very short and that this period of energization may be increased by increasing the relative angular displacement between the two switches to a maximum value at which the entire period during which the switch 273 is closed by the magnets 257 of its associated disc 247 occurs either before or after the period during which the switch 278 is opened by the magnets of its associated disc 248.

In addition to the above described adjustment of the duration of the period of energization of the relay R7, the two switches 273 and 278 may be jointly displaced relative to the switches 263 and 272 to permit the relay R7 to be energized before the energization of the relay R2 despite any adjustment in the position of the switch 272 which controls the energization of the relay R2. The purpose of this adjustment will be later described.

Referring now to Figs. 30, 31a and 31b for a detail description of the electrical circuit employed in the control system of the wash box 31, it will be noted that the parallel branch circuits 285 to 289, inclusive, and 291 to 294, inclusive, are connected between and supplied with electrical energy through wires 296 and 297 which are in turn connected through switches 298 and 299, respectively, to a conventional power supply source. A signal light 301 is connected between the wires 296 and 297 adjacent the switches 298 and 299 to indicate whether or not the circuit has been energized by the closing of the switches. The wires 296 and 297 are also connected to the high voltage terminals of the step-down transformer 283.

It will be noted at this point that six solenoid operated valves S1 to S6, inclusive, are employed in the control circuit for a purpose that will be later described. Two of these solenoid operated valves S1 and S4 have their operating coils connected in parallel between the wire 296 and a wire 302 by branch lines 303 and 304, respectively. The wire 302 connects the two branch lines 303 and 304 to the wire 297 through the contactors CR7 of the relay R7. Solenoid operated valves S2 and S5 are similarly connected between the wires 296 and 297 by parallel branch lines 305 and 306, respectively, and by a wire 307 through the contactors CR8 of the relay R8. Solenoid operated valves S3 and S6 are similarly connected between the wires 296 and 297 by parallel branch lines 308 and 309 and by a wire 311 through the contactors CR9 of the relay R9. It will be readily apparent that closing of the contactors CR7, CR8 and CR9 by energization of the relays R7, R8 and R9, respectively, will independently control the jointly operated pairs of solenoid valves S1 and S4, S2 and S5, and S3 and S6.

One of the low voltage terminals of the step-down transformer 283 is connected to a ground wire 312 to provide a return for the grounded terminals of the solenoids 223 and 224 of the control valves 163. The other low voltage terminal of the transformer 283 is connected by wires 313 and 314 to the contactors CR1 and CR2 of the relays R1 and R2 and through the contactors CR1 and CR2 to the leads 234 and 233 of the solenoids 224 and 223, respectively, for the control valves 163 associated with the valves 147, 148, 153 and 154 of compartment A of the wash box 31. In other words, when the contactors CR1 are closed, the leads 234 for the solenoids 224, which effect downward movement of the valves 147, 148, 153 and 154 of compartment A of the wash box 31, are connected to the terminal of the transformer 283. When the contactors CR2 are closed the leads 233 of the solenoids 223, which effect upward movement of the valves associated with compartment A, are connected to the terminal of the transformer 283. The leads 234 and 233 for the solenoids 224 and 223 of the control valves 163 associated with the valves 149, 150, 155 and 156 of compartment B are similarly connected through the contactors CR3 and CR4 of relays R3 and R4, respectively, to wires 315 and 316 which lead to the same low voltage terminal of the transformer 283 as wires 313 and 314. Wires 317 and 318 similarly connect the same low voltage terminal of the transformer 283 to the contactors CR5 and CR6 of the relays R5 and R6 and through the contactors to the leads 234 and 233 of solenoids 224 and 223, respectively, for the control valves 163 associated with valves 151, 152, 157 and 158 of compartment C of the wash box 31.

The above described connections between the solenoids 223 and 224 of the control valves 163 associated with the valves 147, 148, 153 and 154 of compartment A; valves 149, 150, 155 and 156 of compartment B; and valves 151, 152, 157 and 158 of compartment C will cause the valves of each compartment, for example, valves 147, 148, 153 and 154 of compartment A, to operate in synchronized relationship with each other. It will be readily apparent, however, that the two valves on one side of any of the compartments may be caused to operate with a phase difference of one hundred and eighty degrees from the two valves of the other side of the same compartment by reversing the connections of the leads 233 and 234 to the solenoids 223 and 224 of the control valves 163 associated with either two valves. For example, valves 147 and 148 of compartment A may be caused to operate with a phase difference of one hundred and eighty degrees from valves 153 and 154 of compartment A.

Recalling that the valves 147 to 158, inclusive, are moved between their positions for admitting air to the upper portion of the outer section of their associated cells and for releasing the air therefrom by the alternate energization of the solenoids 224 and 223, respectively, of their associated control valves 163, it will be readily apparent that the cycles of operation of the valves 147 to 158, inclusive, associated with the different compartments A, B and C, will correspond with the cycles of operation of the relays CR1 and CR2, CR3 and CR4, and CR5 and CR6, respectively, and the valves of compartment B will operate with a phase difference of one hundred and eighty degrees from the valves of the other compartments. The valves 147 to 158, inclusive, of any one compartment A, B or C, however, will be simultaneously actuated for movement between each of their positions. The rate of movement of each of the valves 147 to 158, inclusive, in either direction between their alternate positions, may be independently varied by adjustment of the regulating screws 215 and 216 as was previously described.

Referring now to Figs. 31a and 31b for a detail description of the remainder of the control system for the wash box 31, there is shown a line 319 which is connected to a suitable source of supply of compressed air. Air flowing through the supply line 319 passes through a trap or filter 320 and a pressure regulator 321 which maintains the pressure of the compressed air supplied to the system at a fixed, selected value of, for example, twenty pounds per square inch. A gauge 322 is provided for determining the pressure of the air in the supply line 319. From the supply line 319, compressed air flows through branch lines 323 to 328, inclusive, to the integral bypass panels 329 to 334, inclusive, of the six control instruments 335 to 340, inclusive, which are of the full throttler type with proportional position action and provide a manual reset adjustment. The supply line 319 is also connected by a header 341 and branch lines 342 to 347, inclusive, to actuation controllers or positioners 348 to 353, inclusive, for the six positioning devices 134 associated with the drives for the rotary gates 81 and 82 of each of the compartments A, B and C.

The measuring element 354 of the control instrument 335 is connected through a static air pressure line 355 to the upper portion of the outer section of the cell Ab4 of compartment A of the wash box 31 through a trap or filter 356 which is positioned in the line between the wash box 31 and the solenoid operated valve S1.

The measuring elements 357 and 358 of two instruments 336 and 337 are similarly connected by static air pressure lines 359 and 360 to the upper portions of the outer sections of the cells Bb4 and Cb4, respectively, of compartments B and C of the wash box 31. Traps 361 and 362 are provided for the two static pressure air lines 359 and 360, respectively, and the solenoid operated valve S2 is connected in line 359 while solenoid operated valve S3 is connected in the line 360.

The measuring elements 363, 364 and 365 of control instruments 338, 339 and 340, respectively, are similarly connected by static air pressure lines 366, 367 and 368 to the upper portions of the outer sections of cells Aa4, Ba4 and Ca4 of compartments A, B and C through solenoid operated valves S4, S5 and S6 and traps 369, 370 and 371, respectively.

An air line 372 leads from the control instrument 335 to the positioner 348 and similar lines 373 to 377, inclusive, lead from the control instruments 336 to 340, inclusive, to the positioners 349 to 353, inclusive. The operation of the positioning devices 134 which regulate the operation of the rotary gates 81 associated with the three compartments A, B and C of the wash box 31 is controlled by the positioners 348 to 350, inclusive, and the positioning devices 134 which are controlled by the positioners 351 to 353, inclusive, regulate the operation of the gates 82 associated with the compartments A, B and C of the wash box 31, as was previously described.

The integral by pass panels 329 to 334, inclusive, the control instruments 335 to 340, inclusive, and the six positioning devices 134 are of conventional construction and are fully illustrated and described in the "Service Training School Bulletin No. 6," published by the Industrial Division of Minneapolis-Honeywell Regulator Company. The pressure regulator 321 is also of conventional construction and is fully illustrated and described in the "Specification No. 801," of the Minneapolis-Honeywell Regulator Company. Positioners 348 to 353, inclusive, are fully illustrated and described in the "Bulletin No. 7001," of the Moore Products Company.

Before describing in detail the manner in which the control system functions to regulate the operation of the wash box 31, it will be noted that water is introduced to the cells Aa3, Aa4, Ba3, Ba4, Ca3 and Ca4 on one side of the wash box from their adjacent header 136 through the branch pipes 138 and that water is similarly introduced to the cells Ab3, Ab4, Bb3, Bb4, Cb3 and Cb4 from the header 136 at the opposite side of the wash box. All of the cells of the wash box are thereby filled to the level indicated in Fig. 4 after which the valves 139 are set to admit the amount of water that is required in the various cells to replace water that has been discharged with the material from the wash box 31 and will remain in this position unless a different setting is required to meet changed operating conditions.

The motor 239 of the timing device is thereafter set in operation with a selected output speed from the transmission unit 238 to rotate the shaft 242 at a rate that is equal to one-half the desired cyclic rate of operation and air is admitted to the reservoirs R on opposite sides of the wash box 31. The switches 298 and 299 are thereafter closed to energize the electrical circuits of the control system at which time the magnets 257, carried by the rotating discs 245 to 256, inclusive, will operate the mercury switches 263 to 265, inclusive, and 272 to 280, inclusive, to effect timed operations of the valves 147 to 158, inclusive, and the solenoid operated switches S1 to S6, inclusive, as was previously described.

It will be readily apparent that movement of the valves 147 to 158, inclusive, to their uppermost positions will permit compresssed air to flow from the associated reservoir R into the enclosed spaces at the upper portions of the outer sections of the cells associated with the valves and will produce a pulsion stroke of the water downwardly beneath the lower edge of the partition 63 and upwardly through the portion of the screen 39 in the inner section of each cell. Movement of the valves 147 to 158, inclusive, to their lower positions, on the other hand, will release the air from the enclosed upper portions of the outer sections of the cells and will produce a suction stroke of the water by permitting the water to flow downwardly through the screen 39 to seek its original level.

Since the four valves of a given compartment A, B or C, which bear identifying numbers falling within 147 to 158, inclusive, are operated in unison, the alternate pulsion and suction strokes of the water in the cells of each compartment will be concurrently initiated. The cycles of pulsion and suction strokes of the wash water in compartments A and C, however, will have a phase difference of one hundred and eighty degrees from the cycles of strokes of wash water in compartment B due to the relative angular displacement of the magnets 257 carried by discs 245 to 256, inclusive, as was previously described. Further, the duration of the pulsion stroke may be lengthened or shortened and the duration of the suction stroke simultaneously shortened or lengthened, respectively, for the wash water in each of the compartments A, B and C by the independent adjustment of the positions of the switches 272, 274 and 276, respectively. The rate of application and release of the compressed air to effect each pulsion and suction stroke, respectively, may also be independently adjusted for each of the cells of the wash box 31 by adjusting the regulating screws 215 and 216 in the block 208 associated with the air motor 162 of each of the valves 147 to 158, inclusive.

After the wash box 31 has been set in operation, a mixture of different settling rate particles and water is introduced into compartment A of the wash box through the inlet chute 32. This flow of material into the wash box 31 is divided by the partition 34 so that the material on opposite sides of the chute 32 will flow into the inner sections of the two chambers A$a$ and A$b$. During the flow of the material through the chute 32 there will generally be some segregation of the material particles as to size so that the material entering the two chambers A$a$ and A$b$ may differ as to the size of the particles introduced. The valves 147, 148, 153 and 154, therefore, are jointly adjusted by positioning the lever 266 of the switch 272 so that the timed intervals between the initiation of successive pulsion and suction strokes of the wash water in each cycle of operation is best suited for the stratification of particles of a size equal to the average size of the particles in both chambers A$a$ and A$b$. The valves 147 and 148 are also independently adjusted by adjustment of their associated regulating screws 215 and 216 to vary the rates of movement of the valve in opposite directions and to thereby vary the duration of the periods during which the valve is in its two end positions for effecting the successive pulsion and suction strokes of the wash water in accordance with the difference between the average size of the particles in the inner section A$a$1 of the chamber A$a$ and the average size of the particles in the two chambers A$a$ and A$b$. The operations of the valves 153 and 154 are also independently adjusted to provide the most efficient operation for the particular size particles in the inner section A$b$1 of the chamber A$b$. Similar adjustments may be made as described above for the valves associated with the compartments B and C.

The material introduced to the compartment A forms a longitudinally extending bed on the screens 39 of the inner sections A$a$1 and A$b$1 of the compartment. This bed of mineral particles is subjected to the repeated cycles of pulsion and suction strokes of the water produced by the operations of the valves 147, 148, 153 and 154. Since each pulsion stroke of the water tends to lift and open up the mineral particles forming the bed, the particles having the lowest settling rates will accumulate in the upper portion of the bed and the particles having the higher settling rates will accumulate in the bottom portion of the bed. The material adjacent the discharge end plate 42 of the compartment A, therefore, will have been stratified with the particles having the higher settling rate in the bottom portion of the bed. Some of the smaller sized particles having high settling rates will pass downwardly through the screens 39 and into the troughs 37 beneath the chambers A$a$ and A$b$. This material will then pass downwardly along the troughs 37 through the openings 49 and 51 in the partition 48 and discharge end plate 42, respectively, and will thereafter settle in the bottom portion of the housing of the elevator assembly 53 for removal by the buckets 71.

Longitudinal movement of the material supported on the screens 39 in the compartment A is produced by spillage of water and material from the upper portion of the bed over the weir plate 68 during each pulsion stroke of the wash water in compartment A and by the removal of the mineral particles from the bottom portion of the bed by the refuse draw 52 associated with the compartment A. In order to prevent the removal of mineral particles having lower settling rates by the rotary discharge gates 81 and 82, it is desirable to maintain at a given value the thickness of the stratum of higher settling rate particles in the bottom portion of the bed adjacent each gate. Since the rate of accumulation of higher settling rate particles in the bottom portion of the bed may vary from time to time, the thickness of the stratum of such particles can be maintained at a constant value only by varying the rate of rotation of the gates 81 and 82 in accordance with the variations in the thickness in this stratum of the bed adjacent each gate.

It has been found that the pressure of the air in the upper portion of the outer section of each cell A$a$4 and A$b$4, adjacent the gates 82 and 81 and on opposite sides of the wash box 31, will vary in a direct relationship with variations in the thickness of the stratum of higher settling rate particles on the portion of the screen 39 associated with the cell. Of course, the pressure within these enclosed spaces will vary during each pulsion and suction stroke of the wash water but variations in the pressure during like portions of successive pulsion strokes will vary primarily in accordance with the thickness of the stratum of higher settling rate particles. The static air pressure lines 366 and 355, therefore, are opened by operation of the solenoid operated valves S4 and S1 during a very small portion of each pulsion stroke immediately preceding the operation of the relay R2 to produce a suction stroke of the wash water. The duration of the period during which the valves S1 and S4 are opened is regulated by adjusting the relative positions of the two mercury switches 273 and 278, as was previously described, and the positions of the two switches 273 and 278 are adjusted relative to the position of the switch 272 so that the valves will open immediately preceding the operation of the relay R2. The pressure of the air in the static pressure air lines 366 and 355, therefore, will vary in accordance with the thickness of the strata of higher settling rate particles on the screens 39 of cells A$a$4 and A$b$4 of compartment A. The pressure of the air in the static air pressure line 366 is applied to the measuring element 363 of the control instrument 338 and the pressure in the static air pressure line 355 is applied to the measuring element 354 of the control instrument 335.

Variations in the pressures applied to the measuring elements 363 and 354 will cause the control instruments 338 and 335, respectively, to proportionately vary the higher pressure of the control air in lines 375 and 372 which is applied to the positioners 351 and 348, respectively. These positioners will in turn apply pressures to their associated positioning devices 134 which are higher but vary in direct proportion with variations in the pressure in the control air lines 375 and 372. The positioning devices 134 associated with compartment A, therefore, will vary the position of their associated levers 132, in accordance with variations in the pressures in the enclosed upper portions of the outer sections of the cells Aa4 and Ab4 and will thereby vary the rate of rotation of the gates 82 and 81, respectively, as was previously described. The operation of the gates 81 and 82 for the compartments B and C are identical to that described above in connection with compartment A and will not be described again. It will be noted, however, that the quantity of higher settling rate particles introduced to successive compartments A, B and C will be progressively reduced so that independent control of the operations of the gates 81 and 82 associated with the three compartments is necessary to prevent the discharge of lower settling rate particles by the various rotary gates.

The operation of compartment A of the wash box has been described in detail above and this description will not be repeated in detail for compartments B and C. It will be readily apparent that the material and water spilling over the weir plate 68 at the discharge end of compartment A will flow across the plate 65 into compartment B where it will be subjected to alternate pulsion and suction strokes of the water in the same manner as was previously described in connection with compartment A. Further, the mineral particles and water which spill over the weir plate 68 at the discharge end of compartment B will flow across the plate 65 for introduction to the compartment C where they are subjected to the further stratifying action of the pulsion and suction strokes of the water within the compartment C and the particles in the upper portion of the bed are spilled over the weir plate 68 at the discharge end of compartment C for removal from the wash box through the outlet chute 33.

It will be noted that the material passing successively longitudinally through the inner sections Aa1, Ba1 and Ca1 of compartments A, B and C, respectively, is separated from the material flowing through the inner sections Ab1, Bb1 and Cb1 throughout the length of the wash box 31 by the partitions 34 and 66. It will be further apparent that the simultaneously actuated pulsion and suction strokes of the water in the laterally opposed pairs of cells Aa3 and Ab3, Aa4 and Ab4, Ba3 and Bb3, Ba4 and Bb4, Ca3 and Cb3 and Ca4 and Cb4 will cause the horizontal displacement of the wash water in each cell to be balanced by the opposed horizontal displacement of the water in its laterally opposed cell so that the application of unbalanced forces to the supporting structure for the wash box 31 is substantially eliminated. It will also be noted that the arrangement of the various cells of the wash box 31 in laterally opposed pairs permits the use of a wide material bed supporting area with independent control of the action of the wash water in relatively small portions of the bed.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a washing jig for continuously separating mineral particles of different settling rates into two end products by subjecting a bed of the particles to the stratifying action of repeated cycles of pulsion and suction strokes of a body of water, the improvement which comprises means forming an enclosed space above a portion of the body of water, a reservoir for receiving a supply of compressed air, a valve movable to a first position to admit compressed air from said reservoir to said enclosed space and movable to a second position to release air from said space, means for alternately moving said valve between said first and said second positions, means for adjusting the valve moving means to establish a selected rate of movement of the valve toward either of said positions independently of the rate of movement of the valve toward the other of said positions, and means for regulating the actuation of said valve moving means to provide a selected time interval between alternate movements of said valve.

2. A washing jig as defined in claim 1 further characterized by said valve being of the reciprocating type movable in opposite directions past its closed position to said positions for admitting compressed air to and releasing the air from said space, and said valve moving means comprising a reciprocating type fluid motor.

3. A washing jig as defined in claim 2 further characterized by said fluid motor having a piston, separate passageways communicating with the spaces on opposite sides of the piston, and a venting passageway adjacent each of said separate passageways; and a control valve movable between positions for supplying pressure fluid to alternate ones of said separate passageways and for placing the other separate passageway in communication with its adjacent venting passageway.

4. A washing jig as defined in claim 3 further characterized by the means for adjusting the valve moving means comprising separate members movable to variably restrict the flow of pressure fluid through each of said venting passageways, the rates of flow of fluid through alternate venting passageways controlling the rates of movement of said piston in opposite directions.

5. A washing jig as defined in claim 3 further characterized by the means for regulating the actuation of said valve moving means comprising means for moving said control valve between its positions for supplying pressure fluid to alternate ones of said separate passageways and for placing the other separate passageway in communication with its adjacent venting passageway, and means for actuating the control valve moving means to move said control valve between said positions after the elapse of predetermined intervals.

6. A washing jig as defined in claim 5 further characterized by the control valve moving means comprising a pair of solenoids alternately operable to effect movement of the control valve to either of its positions, and the means for actuating the control valve moving means comprising separate electrical circuits for energizing said solenoids, a switch for opening and closing each of said circuits, a pair of switch operating members movable to open and close said switches in timed relationship, and a drive for jointly moving said members at a selected speed to control the frequency of the alternate movements of said control valve.

7. In a washing jig for continuously separating mineral products of different settling rates into two end products by subjecting a bed of the particles to the stratifying action of repeated cycles of pulsion and suction strokes of a body of water, the improvement which comprises means forming a plurality of enclosed spaces above different portions of the body of water, a reservoir for receiving a supply of compressed air, a valve associated with each of said enclosed spaces and movable between alternate positions for admitting compressed air from the reservoir to the associated space and for releasing air from the space, separate means for moving each valve to said alternate positions, separate means for adjusting each valve moving means to independently control the rates of movement of the associated valve into either of its alternate positions independently of the rate of movement of the valve into the other of its alternate positions, and means for jointly regulating the actuation of said valve moving means to provide a selected timed relationship between alternate movements of each valve and between the cycles of alternate movements of different ones of said valves.

8. A washing jig as defined in claim 7 further characterized by each of said valves being of the reciprocating type movable in opposite directions past its closed position to said alternate positions, and the valve moving means associated with each valve comprising a reciprocating type fluid motor.

9. A washing jig as defined in claim 8 further characterized by a control valve associated with each fluid motor and movable between alternate positions for admitting pressure fluid to and venting pressure fluid from said motor to operate the latter, and said means for adjusting each valve moving means comprising separate members movable to variably restrict the venting of pressure fluid from each fluid motor in each position of the associated control valve.

10. A washing jig as defined in claim 9 further characterized by the means for jointly regulating the actuation of said valve moving means comprising a pair of solenoids for moving each control valve to its alternate positions, separate electrical circuits for energizing the two solenoids of each control valve, a plurality of pairs of switches, each of said pairs of switches being connected in the combined circuits of the corresponding solenoids of selected ones of said control valves to synchronize the operation of the selected control valves, a switch operating member associated with each of said switches, and a drive for jointly operating said switch operating members to open and close the switches of each pair in timed relationship with each other and to operate each pair of switches in timed relationship with the other pairs.

11. A washing jig for separating mineral particles of different settling rates into two end products comprising a wash box having a longitudinally extending vertical partition dividing the box into two transversely opposed side-by-side chambers for receiving separate bodies of water, means longitudinally dividing each of said chambers into inner and outer sections, the inner and outer section of each chamber being in communication with each other along a region spaced below the surface of the body of water within the chamber, a screen mounted in each of said inner sections for supporting a bed of mineral particles, means for introducing a mixture of water and mineral particles having different settling rates onto both of said screens, means associated with each of said outer sections for pulsating the body of water in the chamber through the bed of mineral particles supported upon the screen of the associated inner section to subject the particles to the stratifying action of repeated cycles of pulsion and suction strokes of water, means for jointly actuating the water pulsating means associated with both of said outer sections to simultaneously initiate the pulsion and suction strokes of water in the chambers, means for varying the duration of the pulsion and suction strokes of water within each of said chambers, and means for independently varying the rates of application of the pulsion and suction strokes of water in each of said chambers.

12. A washing jig for separating mineral particles of different settling rates into two end products comprising a wash box having a longitudinally extending vertical partition dividing the box into two transversely opposed side-by-side chambers for receiving separate bodies of water, means longitudinally dividing each of said chambers into inner and outer sections, the inner and outer section of each chamber being in communication with each other along a region spaced below the surface of the body of water within the chamber, a screen mounted in each of said inner sections for supporting a bed of mineral particles, transversely extending partitions mounted within said wash box to divide each chamber into a plurality of cells located below said screen, means for introducing a mixture of water and mineral particles having different settling rates onto both of said screens, means associated with each of said outer sections for pulsating the body of water in the chamber through the bed of mineral particles supported upon the screen of the associated inner section to subject the particles to the stratifying action of repeated cycles of pulsion and suction strokes of water, means for jointly actuating the water pulsating means associated with both of said outer sections to simultaneously initiate the pulsion and suction strokes of water in the opposed chambers, and means for independently varying the duration of the pulsion and suction strokes of water within the repeated cycles.

13. A washing jig as defined in claim 12 including means for varying the rates of application of the pulsion and suction strokes of water independently of each other in each of said cells.

14. In a washing jig for separating mineral particles of different settling rates into two end products, in combination a wash box, a longitudinally extending partition mounted in said wash box to divide the latter into two chambers each having a separate body of water therein, a longitudinally extending partition mounted in each of said chambers with its lower edge in spaced relationship with the bottom of the wash box to divide the chamber into inner and outer sections communicating with each other at the bottom of the box, screen means for supporting a bed of mineral particles in the inner section of each chamber, means for introducing a mixture of mineral particles having different settling rates to the end of the screen means at one end of the wash box, means defining an enclosed space above the body of water in the outer section of each chamber, means defining a reservoir adjacent each enclosed space for receiving a supply of compressed air, means for alternately admitting compressed air to each enclosed space from the adjacent reservoir and releasing the air from the enclosed space to pulsate the body of water in each chamber through the screen means of its inner section to repeatedly subject the mineral particles on the screen means to the stratifying action of alternate pulsion and suction strokes of water, means for jointly actuating the air admitting and releasing means associated with each enclosed space to simultaneously initiate the pulsion and suction strokes of water in the two chambers, means for varying the relative durations of the pulsion and suction strokes of water, and means for independently varying the rates of admission and release of air to and from, respectively, each enclosed space.

15. A washing jig as defined in claim 14 further characterized by transversely extending partitions mounted in aligned positions in the two chambers to divide the latter into a plurality of laterally opposed pairs of cells, the portions of said transversely extending partitions in the inner sections of said chambers having their upper edges positioned adjacent the bottoms of the associated screens, said transversely extending partitions being extended into said space above the body of water in the outer section of each chamber to define an individual enclosed space associated with each of said pair of cells.

16. In a washing jig for separating mineral particles of different settling rates into two end products, in combination a wash box having mounted therein transversely extending partition means dividing said box into a plurality of separated compartments, a longitudinally extending partition dividing each compartment into two transversely opposed chambers for receiving separate bodies of water, screen means mounted in the adjacent inner sections of the two chambers in each compartment for supporting a longitudinally divided bed of mineral particles thereon, means for introducing a mixture of water and mineral particles having different settling rates to the screen means of the compartment at one end portion of said box across substantially the entire width of said bed, means for discharging a mixture of water and mineral particles from the screen means of the compartment at the other end portion of said box, means associated with the section of each chamber outwardly of said screen means for pulsating the bodies of water in the chambers to subject the mineral particles supported on the screen means to the stratifying action of repeated cycles of pulsion and suction strokes of water, means for jointly actuating the water pulsating means associated with the two chambers of each compartment to simultaneously initiate the pulsion and suction strokes of water in the compartment, means for sequentially operating the actuating means of the plurality of compartments to maintain a fixed timed relationship between the cycles of pulsion and suction strokes of water in the respective compartments, means for adjusting said operating means to inversely vary the durations within each cycle of the pulsion and suction strokes of water in each compartment independently of each other and of the durations of the pulsion and suction strokes of water in the other compartments, means at the end of each compartment most remote from said introducing means for separately removing the two end products from both sides of the divided bed, and means for transferring one of the end products longitudinally from one compartment to the screen means of the next adjacent compartment and from the compartment at said other end portion of the box to said discharging means.

17. A washing jig as defined in claim 16 further characterized by means for independently adjusting the water pulsating means associated with each of said chambers to vary the rate of application of the pulsion and suction strokes of water in each compartment independently of each other and of the rates of application of the pulsion and suction strokes of water in the other compartments.

18. In a washing jig for separating mineral particles of different settling rates into two end products, in combination a wash box having mounted therein a plurality of primary transversely extending partitions dividing the wash box into a plurality of separated compartments, a longitudinally extending center partition dividing each compartment into two transversely opposed chambers for receiving separate bodies of water, a longitudinally extending side partition mounted in each chamber to divide each chamber into an inner and an outer section communicating at the bottom of the box, a screen mounted across the inner section of each chamber for supporting a bed of mineral particles, a cover mounted across the outer section of each chamber to define an enclosed space above the water in the outer section, a secondary transversely extending partition mounted in each of said compartments to divide each chamber into a pair of inner and outer cells, the portions of said secondary partitions in the inner sections of said chambers having their upper edges positioned adjacent the bottom of the associated screen and the portions of said secondary partitions in the outer sections of said chambers having their upper edges abutting the associated covers to define a separate enclosed space above the body of water in each outer cell, means for introducing a mixture of water and mineral particles having different settling rates to the screens of a compartment at one end of said box, means for supplying compressed air to the enclosed space above each of said outer cells, valve means for alternately admitting compressed air from said air supply means to the enclosed space of each outer cell and releasing the air from the enclosed space of each cell to pulsate the body of water in the associated inner cell to repeatedly subject the mineral particles on the screen to the stratifying action of alternate pulsion and suction strokes of water, means for jointly actuating the valve means associated with each opposed pair of cells to simultaneously initiate the pulsion and suction strokes of water in each opposed pair of cells, means for sequentially operating the valve actuating means for the valve means of the different compartments to maintain a fixed timed relationship between the cycles of pulsion and suction strokes of water in the different compartments, means for adjusting said sequentially operating means to vary the durations within each cycle of the pulsion and suction strokes of water in each compartment independently of the other compartments, means for independently adjusting the operation of each of said valve means to vary the rates of application of a respective pulsion and suction stroke of water in each of said cells, means at the end of each compartment most remote from said introducing means for separately removing the two end products from each compartment, the removing means including means for transferring one of the end products from one compartment to the screen means of the next adjacent compartment and from the compartment at the end of said box most remote from said introducing means to a discharge means located at said remote end of said box.

References Cited in the file of this patent

UNITED STATES PATENTS

| | | |
|---|---|---|
| 1,077,876 | Elmore | Nov. 4, 1913 |
| 1,391,531 | Dorton | Sept. 20, 1921 |
| 2,132,376 | Bird | Oct. 11, 1938 |